(12) United States Patent
Wynn

(10) Patent No.: US 7,918,921 B2
(45) Date of Patent: *Apr. 5, 2011

(54) GAS SEPARATION MEMBRANE MODULE ASSEMBLY WITH RESIDUE MANIFOLD

(75) Inventor: Nicholas P Wynn, Redwood City, CA (US)

(73) Assignee: Membrane Technology and Research, Inc, Menlo Park, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/220,973

(22) Filed: Jul. 29, 2008

(65) Prior Publication Data

US 2009/0020008 A1    Jan. 22, 2009

Related U.S. Application Data

(63) Continuation-in-part of application No. 11/050,995, filed on Feb. 4, 2005, now Pat. No. 7,404,843.

(51) Int. Cl.
*B01D 53/22* (2006.01)
(52) U.S. Cl. .......... 95/45; 95/51; 95/52; 96/7; 96/8; 96/9; 96/10; 210/321.78; 210/321.79; 210/321.8; 210/321.88; 210/500.23
(58) Field of Classification Search ........... 95/45, 51, 95/52; 96/4, 7, 8, 9, 10; 210/321.78, 321.79, 210/321.8, 321.88, 321.89, 500.23
See application file for complete search history.

(56) References Cited

U.S. PATENT DOCUMENTS

| | | | |
|---|---|---|---|
| 3,774,771 A | 11/1973 | Manjikian et al. | |
| 4,083,780 A | 4/1978 | Call | |
| 4,666,469 A * | 5/1987 | Krueger et al. | 96/8 |
| 4,676,808 A * | 6/1987 | Coplan | 96/8 |
| 5,160,042 A * | 11/1992 | Bikson et al. | 210/321.8 |
| 5,238,563 A | 8/1993 | Smith, Jr. et al. | |
| 5,288,308 A * | 2/1994 | Puri et al. | 96/8 |
| 5,468,283 A | 11/1995 | French et al. | |
| 5,470,469 A | 11/1995 | Eckman | |
| 6,004,383 A | 12/1999 | Kuhnelt | |
| 6,370,887 B1 | 4/2002 | Hachimaki | |
| 6,616,735 B1 | 9/2003 | Burban et al. | |
| 6,632,356 B2 | 10/2003 | Hallan et al. | |
| 6,755,894 B2 | 6/2004 | Bikson et al. | |
| 6,814,780 B2 | 11/2004 | Bikson et al. | |
| 6,887,304 B2 | 5/2005 | Stroh et al. | |
| 7,179,323 B2 | 2/2007 | Stein et al. | |
| 7,255,729 B2 | 8/2007 | Yamada et al. | |
| 7,404,843 B2 * | 7/2008 | Kaschemekat et al. | 96/10 |
| 7,510,594 B2 * | 3/2009 | Wynn et al. | 96/10 |
| 7,758,670 B2 * | 7/2010 | Wynn et al. | 96/10 |
| 2003/0154856 A1 * | 8/2003 | Anderson | 96/8 |
| 2005/0214613 A1 | 9/2005 | Sarkar et al. | |
| 2006/0144777 A1 * | 7/2006 | Kumano et al. | 96/8 |
| 2006/0163140 A1 | 7/2006 | Taylor et al. | |

* cited by examiner

*Primary Examiner* — Jason M Greene
(74) *Attorney, Agent, or Firm* — J. Farrant; K. Bean

(57) ABSTRACT

A gas-separation membrane module assembly and a gas-separation process using the assembly. The assembly includes a set of tubes, each containing gas-separation membrane elements, arranged within a housing. The housing contains tube sheets that divide the space within the housing into three separate, gas-tight spaces, with the tubes mounted in the central space. Feed gas enters the tubes through apertures positioned to feed multiple membrane elements within a tube in parallel, and one or more manifolds are used to collect residue gas from the membrane elements and direct the gas to the residue port or to a second group of membrane elements within the tube. The assembly can be used in various ways to carry out gas separation processes.

34 Claims, 17 Drawing Sheets

GAS SEPARATION MEMBRANE MODULE ASSEMBLY WITH RESIDUE MANIFOLD

This application is a continuation-in-part of Ser. No. 11/050,995 filed Feb. 4, 2005 U.S. Pat. No. 7,404,843, which is incorporated herein by reference in its entirety.

FIELD OF THE INVENTION

The invention relates to gas separation membranes, and specifically to an assembly for gas separation membranes. In particular, the invention relates to an assembly of multiple membrane modules contained in a single housing or pressure vessel.

BACKGROUND OF THE INVENTION

Gas separation membranes have been in industrial use for close to 25 years. Various types of membrane are available, although almost all commercially successful membranes are polymeric membranes formed as flat sheets or hollow fibers.

For use, it is desirable to pack a large membrane area into a small volume. Because membranes are delicate, susceptible to damage and may have a limited operating life, they are normally factory-built into modules or elements.

Two predominant types of membrane modules have emerged. If the membranes are in hollow-fiber form, bundles or hanks of closely spaced fibers are potted in a cylindrical pressure housing or tube. A single hollow fiber module may contain as much as 1,000 km of fiber. Feed gas may flow on the shell or bore side of the fibers. The permeate gas may be routed to a single collection pipe by which it exits the module.

Flat-sheet membranes are commonly packaged into spiral-wound modules. A spiral-wound module has a central perforated permeate collection tube, around which are wound membrane envelopes interleaved with spacers to define feed and permeate channels. The module is usually finished with an outer wrap of fiberglass or the like and mounted in a pressure housing. Feed passes axially down the module across the membrane envelope. A portion of the feed permeates into the membrane envelope, where it spirals towards the center and exits through the collection tube, which may protrude at one or both ends beyond the membrane envelope. Modules typically contain multiple membrane envelopes, such as 20 or more, and have a usable membrane area of up to 40 or 50 m$^2$.

Less commonly, membrane elements may take other forms. For example, they may simply be rigid tubes, such as ceramic tubes, with the selective membrane as the inside or outside surface.

Modules or elements are normally built in standard sizes. Ideally, the standard size module is limited to that which can be manhandled easily by one or two persons, with a weight up to about fifty pounds. The requirement for a specific membrane area is met by installing the appropriate number of factory-made elements in suitable permanent housings. If the membranes need to be replaced in the field, the complete module is removed from the housing and replaced with a new factory-built module. This procedure minimizes any plant downtime required for membrane replacement.

In gas processing plants, gas flows and membrane performance are such that membrane area requirements may be very large, in the range of hundreds, thousands or even tens of thousands of square meters. Large numbers of modules need to be installed in such plants and housed in an effective and economical manner.

In gas separation, individual modules or elements are connected end-to-end, typically in a line of up to about six modules, within a single tube. The tube serves not only to house and support the membrane elements and provide a directed gas flow, but also as the pressure-withstanding vessel that permits operation of the membrane unit at pressures substantially different from the outside atmospheric pressure. The tubes are usually made of stainless or carbon steel, and pressure code-stamped for their intended application.

Various other arrangements have been proposed for arranging multiple membrane modules or elements within a single pressure housing, mostly for reverse osmosis applications.

U.S. Pat. No. 3,774,771 describes an assembly of modules mounted in parallel within a single housing. The modules consist of product tubes around which a piece of reverse osmosis membrane is wound in a helical pattern. Each of these modules is contained within a feed flow tube. The feed flow tubes are connected so that feed can be introduced through an inlet at one end of the housing to several tubes in parallel, can pass down this set of tubes to the other end of the housing, and then pass back along the housing through another set of tubes. Residue is withdrawn from this set of tubes through an outlet adjacent to the feed inlet. Liquid that has permeated the membranes and entered the product tubes is collected and withdrawn through an outlet at the other end of the module.

Each feed flow tube has a hole that allows a volume of feed liquid to leak out from the processing path within the tubes to the space within the housing outside the feed tubes. In this way, pressure is equalized on both sides of the tubes. The assembly is used for reverse osmosis.

U.S. Pat. No. 4,083,780 describes an assembly containing multiple tubes arranged in parallel, with multiple spiral-wound modules in series within each tube.

U.S. Pat. No. 5,238,563 describes an assembly in which multiple membrane modules or elements are housed in parallel. The feed is introduced through a nozzle in the longitudinal shell of the housing and occupies the space between the external surfaces of the modules and the internal surface of the housing.

There remains a need for assemblies that enable gas separation membrane modules to be housed in compact housings that are simple and safe, as well as inexpensive to manufacture, and that provide for easy replacement of modules within the housing. As new gas separation applications develop, some with very large membrane area requirements, this need is more pressing.

In addition, there remains a need for assemblies that are suitable for gas separation application that are operated under conditions of low or high stage cut.

SUMMARY OF THE INVENTION

The invention has two aspects: a gas-separation membrane assembly, and a gas-separation process using the assembly. In a basic embodiment, the assembly comprises a set of tubes containing the gas-separation membranes, the tubes being arranged within a single vessel or housing.

In its most general embodiment, the assembly includes the following elements:
(a) a vessel having an outer wall and an interior space, usually elongated, divided into three gas-tight spaces: a first end space, a middle space and a second end space;
(b) a plurality of tubes, each having an interior containing at least one membrane module, the tubes being mounted in the middle space;

(c) three ports in the outer wall, one for each space, that enable gas to flow between an environment outside the vessel and the space;
(d) first means to allow gas flow between the first space and the tubes;
(e) second means to collect a permeate gas from a permeate region of the membrane modules and allow gas flow between the permeate region and the second end space;
(f) third means to allow gas to flow between the interior of the tubes and the middle space.

In light of the teachings presented in this summary and the following detailed description of the invention, it will be apparent to the skilled worker that various essentially equivalent mechanical options are available to achieve the above-defined combination of elements, such as to support the tubes in the space, and to provide the means of gas flow between the designated areas.

The housing may be of any shape and construction appropriate to its function, which is to contain the tubes, and to provide pressure- and gas-tight spaces or environments into which gas can be introduced, and from which it can be withdrawn. Typically the housing is a steel pressure vessel with two ends and an elongated central section, adapted to withstand the relatively high differential pressures that are used in gas separation, and pressure code-stamped accordingly.

Most preferably, the vessel is a cylindrical shell with two ends. At least one of these ends should preferably take the form of a reversibly removable head.

The tubes containing the gas-separation membranes are mounted in the housing, usually in a longitudinal direction, that is, parallel to a long axis of the housing and to each other.

The tubes are usually mounted in the housing by means of tube sheets, which support the tubes directly or indirectly at or near one or both of their ends in any convenient manner. The tube sheets also provide the most convenient means to divide the interior of the vessel into defined spaces. The tube sheets are aligned generally perpendicular to the longitudinal axes of the housing and the tubes, thus dividing the space within the housing into three discrete spaces—a first, or feed, space at one end of the housing, a second, or permeate, space at the other end, and a third, or residue, central space occupying the shell or central portion of the housing. The tubes are mounted in this central space.

The housing and tube sheets are connected in gas-tight relationship with each other, so that gas cannot bypass the tubes and flow directly between the three spaces.

The housing is equipped with three ports or nozzles: a first, or feed, port at one end opening into the first or feed space; a second, or permeate, port at the other end opening into the second or permeate space; and a third, or residue, port in the central section or shell opening into the third or residue space. Through these nozzles, feed gas can be introduced into the housing, and treated gas can be withdrawn from the housing.

The tubes contain gas-separation membranes, usually arranged as one or more membrane elements or modules of any type. The membranes may be any type of membrane usable for gas separation, including, but not limited to, polymeric membranes with a rubbery selective layer and polymeric membranes with a glassy selective layer.

The modules include a permeate collection pipe, through which gas that has permeated the membranes can be collected and withdrawn. Most preferably, the membranes are flat-sheet membranes packaged as spiral-wound modules.

The tubes may contain a single module or, more preferably, multiple modules with their permeate pipes connected end-to-end, so that permeate gas leaving one membrane element can flow into the permeate collection pipe of the next membrane element, and so on.

The tube sheets may support the tubes in any convenient manner. Thus, the tubes may butt against the tube sheets, fit into holes, grooves or lips in the tube sheets, or protrude through holes in the tube sheets, for example.

The tubes are aligned with sets of openings or holes in the tube sheets to allow gas to pass between the tubes and the feed space, and to allow permeate gas to reach the permeate space. To allow the modules to be inserted into, and removed from, the tubes, the set of openings at the feed end, the permeate end or both ends should be large enough for the modules to pass through. At the end adjacent to the first or feed space, the tube sheet typically has openings of about the same diameter as the tubes. At these feed ends, the tubes are open to gas flow from or to the feed space.

The feed-end tube sheet and the tubes engage one another to form a gas-tight seal, to prevent leakage of gas directly between the feed space and the residue space. The seal can be made in a reversible or permanent manner.

At the other, or permeate, ends of the tubes, the permeate collection pipes, or extensions thereof, protrude beyond the tubes. It is not required that the tubes make a gas-tight seal against the tube sheet at this end. Indeed, it is not required that the tubes reach the tube sheet at this end, in which case the permeate-end tube sheet does not support the tubes directly, but only indirectly by means of the permeate pipes.

The tubes are adapted to allow gas that has passed across the membranes to flow out of the tubes into the third or residue space. That is, at or near the permeate end, the tubes are at least partially open to the residue space.

As a preferred example, each tube has an aperture or hole in its long, cylindrical surface. This aperture is usually positioned near the permeate end of the tubes. As one alternative example, the tubes may be of shorter length than the distance between the tube sheets, so that there is a gap at the permeate end between the end of the tube and the tube sheet, as mentioned above.

The permeate collection pipes or their extensions fit through openings or holes in the permeate-end tube sheet to allow gas that is in the pipes to flow to the second or permeate space. A preferred arrangement is that the tube sheet contains openings just large enough that the permeate pipes, their extensions and couplings can fit into or through the openings. This arrangement facilitates close placement of the tubes, as well as easy removal of modules for maintenance or replacement. The arrangement includes a gas-tight seal between the permeate pipe and the permeate-end tube sheet, to prevent leakage of gas from the residue space to the permeate space.

The tube sheets may be of any material and thickness appropriate to their function. The tube sheet that divides the residue space from the permeate space must be capable of withstanding the pressure difference between the gases occupying these two spaces. This pressure difference may be high, such as several hundred psi or more.

During operation of the assembly in a gas-separation process, there is usually little pressure drop between the feed and residue gas streams, and hence little pressure difference between the gas in the feed and residue gas spaces. In this case, the feed-end tube sheet need not be resistant to high pressure differences, and can be made relatively thin, or of a relatively light, inexpensive material.

Likewise, because the tubes divide the feed side of the membranes from the residue space, they do not need to withstand high pressure differences and can be made from relatively thin, light materials.

Although elements or features of the assembly have been qualified above by the adjectives "feed" or "residue", this has been done for ease of explanation, and does not mean that the assembly has, necessarily, to be used with the feed gas entering at the feed port and the residue gas leaving through the residue port. The assembly can be operated in various ways. This point is discussed further in the detailed description below.

The gas separation assembly of the invention uncouples the two primary functions of the conventional pressure tubes. The modules are contained and the gas flow is directed by the tubes, which need not be pressure rated or code-stamped for high pressure differences. These tubes may be made from many types of standard, off-the-shelf seamless piping, or may be manufactured to much lower pressure-rating than the housing. The pressure-withstanding function is now fulfilled by the outer vessel or housing, within which the multiple tubes are contained.

Furthermore, because of the plurality of tubes, the assembly allows large numbers of standard size modules to be accommodated in a single housing. Because the gas feed, residue and permeate connections to the plurality of tubes are internal to the assembly, complex external piping and manifolding systems are not required. The assembly itself fulfills this function, but in a more effective way.

Conventional systems using individual pressure tubes connected by external piping are complex, require much space, and are costly to build. This is especially so in gas processing because the materials being processed are normally hazardous and their safe containment is an absolute necessity.

If these connections are made internal to the pressure vessel, the pressure vessel itself provides the containment in a more robust and compact manner than external piping, and with fewer flanges, gaskets, joints and connectors. The greater simplicity allows faster access, and correspondingly less down time, to replace membrane modules, as well as reducing potential for leakage of hazardous materials. In particular, the number of pipes, flanges and connections is reduced enormously. For example, if the housing contains seven membrane module tubes, the number of flanges and connecting pipes is reduced seven-fold.

Thus, this uncoupled arrangement offers a number of advantages compared with conventional pressure housing of membrane modules in a single linear arrangement.

The assembly is also lighter in weight than a conventional array of tubes containing the same amount of membrane area, because only the one outer vessel, rather than each tube, need be built to high-pressure-resistant specification. In addition, heat tracing or insulation of the modules is greatly simplified.

These differences result in very substantial savings in terms of manufacturing complexity and capital cost of equipment.

The assembly offers additional benefits in situations where a gas separation characterized by an unusually low or high stage cut is to be carried out, where stage cut is defined as the ratio of total permeate flow to total feed flow.

In a low stage cut separation, only a small portion of the feed gas, such as less than 40%, less than 30%, less than 20%, or even less, should permeate the membranes. If feed gas is presented to a line of multiple membrane elements sequentially, it is difficult to keep the stage cut sufficiently low, as the total permeate gas flow builds up incrementally from module to module.

The present invention overcomes this difficulty by providing an assembly design in which membrane elements are arranged in multiple tubes within a single vessel, as described above, but in which multiple elements within a single tube may be accessed in parallel by incoming feed gas.

In a preferred embodiment, an assembly adapted to provide such parallel feed comprises:

(a) a plurality of module-carrying tubes each having a longitudinal tube wall and a tube interior containing a plurality of gas separation membrane elements aligned in series along the module-carrying tube;

(b) a housing containing the module-carrying tubes, the housing comprising a residue end, a permeate end and a central portion between the ends;

(c) a residue-end tube sheet mounted in the housing towards the residue end;

(d) a permeate-end tube sheet mounted in the housing towards the permeate end; the tube sheets dividing the interior of the housing into three separate gas-tight spaces: (i) a residue gas space at the residue end, (ii) a permeate gas space at the permeate end, and (iii) a feed gas space in the central portion between the residue and permeate spaces, and in which the module-carrying tubes are mounted in spaced-apart relationship with each other;

(e) a feed gas port in the central portion;

(f) a permeate gas port at the permeate end;

(g) a residue gas port at the residue end;

(h) a set of at least two apertures in each longitudinal tube wall positioned in such a way that parallel feed gas flow to multiple membrane elements within the module-carrying tube is provided;

(i) for each module-carrying tube:

(I) at least one permeate collection pipe in gas-transferring relationship with the gas-separation membrane elements;

(II) a permeate extension pipe, connected to the permeate collection pipe, the connected pipes protruding longitudinally out of the module-carrying tube;

(III) an opening in the permeate-end tube sheet through which the permeate extension pipe protrudes into the permeate end space and against which the permeate extension pipe is sealed in gas-tight relationship;

(j) a residue collection system mounted within the housing and comprising:

(I) at least one residue collection manifold through which the module-carrying tubes pass;

(II) a residue collection tube that passes through the manifold; wherein the residue collection manifold comprises a cylindrical volume having opposed faces and an annular wall between the faces, the faces having multiple oppositely aligned openings through which the module-carrying tubes and the residue collection tube may pass and against which the module-carrying tubes and the residue collection tube are sealed in gas-tight relationship; and wherein the module-carrying tubes and the residue collection tube each have an opening contained within the cylindrical volume through which gas may pass from the module-carrying tubes to the residue collection tube; and (III) at least one opening in the residue end tube sheet that provides gas-transferring communication between the residue collection tube and the residue gas space.

In a high stage cut separation, a large portion of the feed gas, such as at least 50%, at least 60%, at least 70% or even more, should permeate the membranes. If feed gas is presented to a line of multiple membrane elements sequentially, it is difficult to maintain sufficient gas flow along the line of elements, as a high proportion of the gas has been drawn to the permeate side. The low gas flow on the feed side in later elements in the series leads to concentration polarization problems, which adversely affect the separation performance of the process.

The present invention overcomes this difficulty by providing an assembly design in which membrane elements are arranged in multiple tubes within a single vessel, as described above, but in which multiple elements within a single tube may be divided into a first and second membrane separation step, with the membrane elements making up each step being fed in parallel by feed gas to that step.

In a preferred embodiment, an assembly adapted to provide such parallel feed comprises:

(a) a plurality of module-carrying tubes each having a longitudinal tube wall and a tube interior containing a plurality of (n+m) gas separation membrane elements aligned in series along the module-carrying tube, where n and m are positive integers, n being greater than m;

(b) a housing containing the module-carrying tubes, the housing comprising a residue end, a permeate end and a central portion between the ends;

(c) a residue-end tube sheet mounted in the housing towards the residue end;

(d) a permeate-end tube sheet mounted in the housing towards the permeate end; the tube sheets dividing the interior of the housing into three separate gas-tight spaces: (i) a residue gas space at the residue end, (ii) a permeate gas space at the permeate end, and (iii) a feed gas space in the central portion between the residue and permeate spaces, and in which the module-carrying tubes are mounted in spaced-apart relationship with each other;

(e) a feed gas port in the central portion;

(f) a permeate gas port at the permeate end;

(g) a residue gas port at the residue end;

(h) a first set of apertures in each longitudinal tube wall positioned so that only a first group of n membrane elements are fed in parallel with feed gas, the n membrane elements thereby forming a first membrane separation step;

(i) for each module-carrying tube:
(I) at least one permeate collection pipe in gas-transferring relationship with the gas-separation membrane elements;
(II) a permeate extension pipe, connected to the permeate collection pipe, the connected pipes protruding longitudinally out of the module-carrying tube;
(III) an opening in the permeate-end tube sheet through which the permeate extension pipe protrudes into the permeate end space and against which the permeate extension pipe is sealed in gas-tight relationship;

(j) a collector for enabling residue gas from the second membrane separation step to flow into the residue gas space;

(k) an intermediate gas collection and distribution system mounted within the housing for collecting a portion of intermediate residue gas from the first membrane separation step and directing such intermediate residue gas as feed gas in parallel to a second group of the remaining m membrane elements, the remaining m membrane elements thereby forming a second membrane separation step, the intermediate gas collection and distribution system comprising:

(I) an intermediate gas collection manifold through which the module-carrying tubes pass and in gas-transferring relationship with the module-carrying tube interiors;
(II) an intermediate gas distribution manifold through which the module-carrying tubes pass and in gas-transferring relationship with the module-carrying tube interiors;
(III) an intermediate gas flow tube that passes through, and is in gas-transferring relationship with, the intermediate gas collection manifold and the intermediate gas distribution manifold, to enable gas to flow from the gas collection manifold to the gas distribution manifold.

In its second aspect, the invention is a gas-separation process carried out at either low or high stage cut. The process may be used to separate components of any gas mixture, and is expected to be especially useful in natural gas treatment applications, where gas flow rates tend to be large and gas pressures high.

BRIEF DESCRIPTION OF THE DRAWINGS

FIG. 8(a) represents an assembly using conventional pressure tubes, and not in accordance with the invention. FIG. 8(b) represents an assembly of the invention using vessels housing seven tubes, and FIG. 8(c) represents an assembly of the invention using vessels housing 19 tubes.

FIG. 9b shows the feed/residue gas flow pattern through the assembly of FIG. 9a.

FIG. 13b shows the feed/residue gas flow pattern through the assembly of FIG. 13a.

FIG. 14b shows the feed/residue gas flow pattern through the assembly of FIG. 14a.

DETAILED DESCRIPTION OF THE INVENTION

Figure 1:
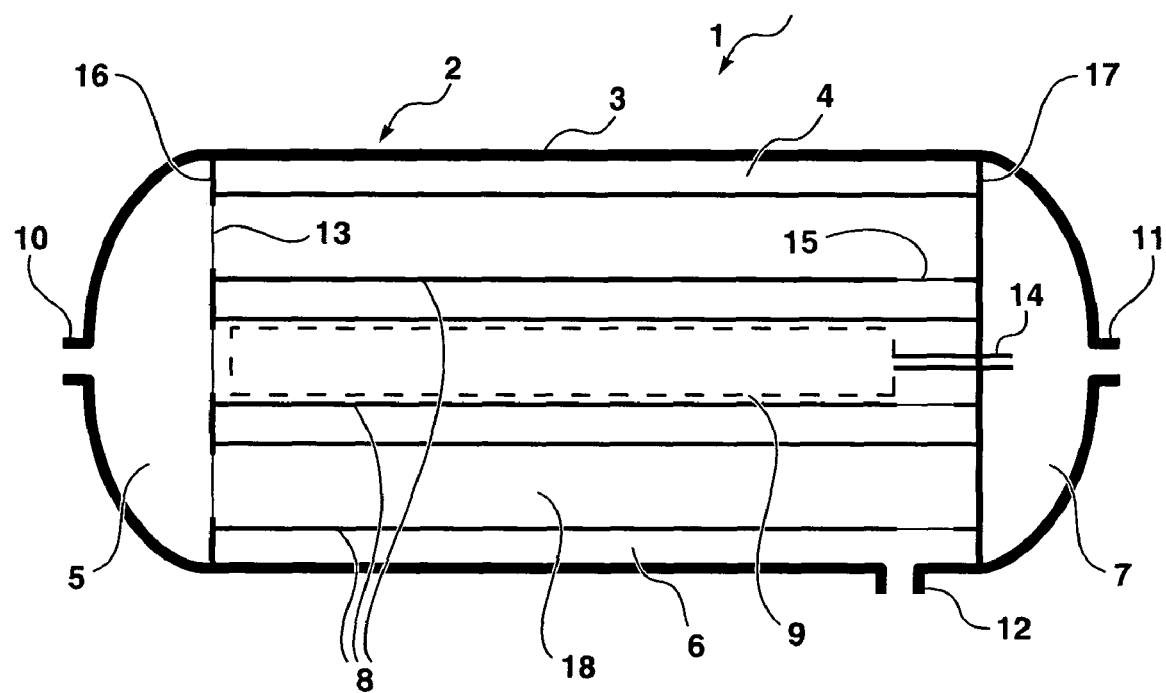
FIG. 1 is a schematic drawing showing a longitudinal section through the assembly of the invention.

The invention is a gas-separation membrane assembly, and a gas-separation process using the assembly. The assembly incorporates multiple gas-separation membranes in an array within a single vessel or housing, the terms vessel and housing being used interchangeably herein.

Feed gas to be treated by membrane separation can be introduced into the housing; the separated, treated gas can be withdrawn from the housing.

The vessel may be of any form appropriate to its function, which is to provide an internal environment in which membrane gas separation can be carried out safely at substantially different (higher or lower) pressures than the outside atmospheric pressure.

A variety of vessel shapes are possible within the scope of the invention, although typically the housing is of elongated form. Most preferably the housing takes the form of a cylindrical vessel, that is, a vessel having a cylindrical shell and two ends.

At least one of the ends, and optionally both, should be a reversibly removable end cap or head to provide access to the ends of the tubes for installation or removal of membrane modules. By this, we mean that the head should not be a unitary part of the cast vessel, nor attached by welding, but should be bolted, screwed, or the like, to the vessel.

The end caps may have any appropriate profile, but usually will be flat or domed. Removable heads typically include a flange or flanges or a screw thread for attachment to the shell body of the vessel.

Many gas separations, such as those used to bring natural gas to pipeline specification, are performed with the feed gas to the membrane units at elevated pressure, such as above 150 psig, above 300 psig, above 500 psig or even up to 1,000 psig or more. The permeate gas may also be maintained at above atmospheric pressure in some cases, or may be under vacuum in others. Thus, considerable pressure differences frequently exist between the outside and inside of the vessel, and between spaces within the vessel, and the vessel should be pressure-rated and code-stamped accordingly. For convenience herein, we refer to gas separation applications in which the vessel is pressure-rated or code stamped for pressures in the hundreds of psi as intermediate-pressure applications and gas separation applications in which the vessel is pressure-rated or code-stamped for pressure of 1,000 psi or above as high-pressure applications.

The material of which the vessel is formed may vary depending upon the use to which it is to be put and the pressure-rating required. Typically the vessel will be metal, usually steel, either stainless or carbon, although other metals, or even non-metallic materials, could be used in some circumstances.

The housing is equipped with three ports or nozzles, through which gas may enter or leave. The nozzles are positioned to provide gas flow into or out of each of the three discrete gas-tight spaces within the vessel, which are explained below. Preferably, the nozzles are located one at each end of the vessel and one in the shell near an end.

Within the housing are multiple tubes that carry the membrane modules and provide a directed path for gas flow.

In principle, many ways to arrange the tubes within the interior space of the vessel can be imagined within the scope of the invention. Based on size, weight and cost considerations, however, the tubes should be packed efficiently into the housing, so as not to leave large volumes of space unoccupied by the tubes.

The preferred arrangement is to align the tubes approximately parallel to each other and to the long axis of the shell of the housing, so that a large number of tubes may be accommodated by a vessel of comparatively small cross-section. As described below, the invention includes additional features that facilitate close packing of the tubes.

The tubes are held in the vessel by means of tube sheets, which support the tubes directly or indirectly at or near one or both of the tube ends. Thus, the tubes occupy the central or shell portion of the vessel. The tube sheets are aligned generally perpendicular to the longitudinal axes of the housing and the tubes, and divide the volume within the housing into three discrete spaces—a first space at one end of the housing, a second space at the other end, and a third space occupying the shell or central portion of the housing and itself partially occupied by the tubes.

For ease of nomenclature and clarity of explanation, in the discussion that follows the first space is designated the feed space, the second space is designated the permeate space, the third space is designated the residue space, and elements or features of the assembly in or near those spaces are identified similarly. However, it should be noted that this nomenclature is used because it describes conveniently a mode in which the inventors prefer to operate the assembly for gas separation, not because it describes intrinsic properties of the spaces.

The vessel and tube sheets are connected in gas-tight relationship with each other, so that gas cannot bypass the membrane-containing tubes and flow directly between the three spaces. The tube sheet that divides the feed space from the residue space is referred to hereinafter as the feed-end tube sheet; the tube sheet that divides the residue space from the permeate space is referred to hereinafter as the permeate-end tube sheet. The tube sheets may be permanently or removably secured to the vessel in any known manner. Preferably, at least the permeate-end tube sheet is welded to the vessel, and most preferably both tube sheets are welded in place.

The tube sheets are typically, but not necessarily, made of the same material as the vessel, such as steel. During operation of the assembly, the permeate end tube-sheet is subjected to whatever pressure difference is maintained between the feed/residue gases and the permeate gas. This tube sheet needs to be pressure-rated accordingly, and will often have to withstand a pressure difference of several hundred psi or more.

The feed-end tube sheet is subjected only to whatever pressure drop occurs from the feed gas to the residue gas, which is usually no more than a few psi, for example 50 psi, 20 psi or less. This tube sheet can be relatively thin and lightweight, therefore.

Likewise, the tubes themselves need only withstand the slight feed-to-residue pressure drop and can be made much thinner and lighter than conventional, industrial gas-separation tubes. That the individual tubes need not serve any significant pressure-withstanding function is one of the benefits of the invention, and reduces the manufacturing cost of high-pressure gas separation systems substantially.

In our invention, the functions of the tubes include carrying the membranes, usually arranged as membrane modules, and directing gas flow. Each tube may contain a single membrane module, also referred to herein as a membrane element or cartridge, but usually and preferably contains multiple modules or elements. Most preferably, each tube contains at least two, and no more than about six membrane elements.

The type and configuration of the membranes and modules is not a limiting aspect of the invention; any types of membranes and modules known in the gas separation arts can be housed in the present assembly. The membranes may be any type of membrane usable for gas separation, including, but not limited to, polymeric membranes with a rubbery selective layer and polymeric membranes with a glassy selective layer.

Most commonly, industrial gas separation membranes are prepared as hollow fibers and packaged as potted hollow-fiber modules, or prepared as flat sheets and packaged as spiral-wound modules. As a less common example, they may be in tubular form, with the selective membrane on the inner or outer surface. This type of module is sometimes used when the separation membranes themselves are inorganic, or are supported on an inorganic support membrane, for example.

These forms are well known in the art and are described copiously in the literature. For simplicity, therefore, the details of module placement and connection, and gas flow around and within the modules, are described below as they relate to polymeric membranes packaged as spiral-wound modules. Those of skill in the art will appreciate that similar arrangements of modules within the tubes and housing can be used for hollow-fiber modules or other arrangements, subject only to minor, straightforward modifications as need be.

As mentioned in the background section, a spiral-wound module comprises one or more membrane envelopes of spacers and membrane wound around a perforated central permeate collection pipe. Typically, the pipe protrudes a short distance beyond the membrane envelopes. When the module is in use, feed gas passes axially down the module across the membrane envelope. A portion of the feed permeates into the membrane envelope, where it spirals towards the center, is drawn through the perforations into the permeate collection pipe and exits through the end of the pipe. The residue gas exits the module axially at the opposite end from that at which the feed gas is introduced.

If a tube contains multiple modules, the modules are connected end-to-end, meaning that permeate gas leaving one module can flow into the permeate channel of the next module. This can be achieved by having one long continuously formed pipe around which multiple membrane modules are wrapped. More preferably, however, the permeate pipes of the individual modules are separate pipes joined by gas-tight connectors or couplings.

Most preferably, these couplings join the permeate pipes in a reversible manner, so that an individual membrane element can be removed and replaced as necessary. For example, the connectors may be flanged or screwed. More commonly they take the form of proprietary quick-release fittings of clamped or compression design, such as TriClover® or Swagelok® fittings, or are simple bayonet fittings with simple O-ring seals.

The inside diameter of a tube is usually, and preferably, only marginally larger in diameter than the outer diameter of the membrane module(s) that it contains, so that the modules, with their permeate pipes connected, can simply be pushed into the tubes, where they fit snugly without additional support. An elastomeric seal, or the like, is normally fitted around the circumference of the modules to provide a gas tight fit to prevent incoming gas bypassing the module. In this case, gas introduced from the feed space into a tube enters the feed end of the first membrane module, passes along the module and exits at the residue end into the space within the tube between the first and second modules. The gas flowing through this space forms the feed to the second module, and so on.

As an alternative, the modules can be spaced a distance from the inner wall of the tube, such as by means of a perforated inner tube of smaller diameter, so that gas entering the tube from the feed space may flow directly into any and all of the first, second or subsequent membrane elements in a parallel flow configuration.

The tube sheets may support the tubes in any convenient manner. Thus, the tubes may butt against the tube sheets, fit into holes, grooves or lips in the tube sheets, or protrude through holes in the tube sheets, for example. The tubes are usually aligned with holes in the tube sheet to permit gas to leave the feed space at one end, and to enter the permeate space at the other.

The feed-end tube sheet divides the feed space and the residue space. In the preferred mode of operating the assembly, gas flows into the housing through the port at the feed end, and from there enters the open feed ends of the tubes and the first membrane module.

Also preferred is that the membrane elements be installed in the tubes from the feed end. Thus, it is convenient, and preferred, that the feed-end tube sheet has openings or holes with diameters about as large as the diameter of the tubes. This not only enables membrane modules to be inserted and removed easily, but also presents a broad cross-section open to incoming gas flow. Also, in this case, the feed end of the housing should be a removable head.

At this end, the tubes and tube sheet engage one another to form a gas-tight seal, to prevent leakage of gas from the feed space directly to the residue space. The seal can be made in a reversible manner, such as by means of a gasket, or may be permanent, such as adhesive or welding. In general, it is preferred that the seal be permanent, and specifically that the tubes and tube sheet be welded or glued together.

At the other, or permeate, ends of the tubes, the permeate collection pipes, or extensions thereof, protrude beyond the tubes. The permeate collection pipes or their extensions fit against, into or through openings or holes in the permeate-end tube sheet, in any manner that allows gas that is in the pipes to flow to the permeate space. A gas-tight seal is provided between the tube sheet and the outer surface of the permeate pipes or extensions, to prevent gas flow from the residue space to the permeate space via the annular gap around the pipe or pipe extension.

The seal may be permanent, if the vessel itself is permanently closed at the permeate end for example.

More preferably, the seal is removable, and is made using a plate or flange attached to the permeate pipe extension and bolted or screwed against the tube sheet, using a gasket or O-ring to ensure a gas-tight seal. The tubes are spaced at least sufficiently far apart to accommodate the bolts or screws in the portions of the tube sheet between the tubes. In this case, the permeate end of the housing should take the form of a removable head.

As another alternative, a bayonet-type seal, that is an elastomeric seal through which the permeate pipe or permeate pipe extension is pushed and that closes around the pipe in gas-tight fashion, can be used. In this case, it is not necessary that the permeate head be removed when installing or removing membrane modules, and the permeate end of the vessel could optionally be welded in place, or the vessel could be cast with a unitary permeate end.

The openings or holes in the permeate-end tube sheet may be of the same size as those in the feed-end tube sheet, so that both end of the tubes are unobstructed by the tube sheet.

It is preferred, however, that the openings in the permeate-end tube sheet are smaller in diameter than the diameter of the tubes. This provides two advantages. First, the tube sheet is stronger mechanically, as more of its total area is solid. This is beneficial, as this tube sheet frequently has to withstand a pressure difference from the residue space side to the permeate space side of several hundred psi. Secondly, the seal or end plate can be much smaller in diameter, enabling the tubes to be packed closer together.

A particularly preferred arrangement is that the tube sheet contains openings just large enough that the permeate pipes or their extensions and their couplings can fit into or through the openings. This arrangement facilitates close placement of the tubes, as well as easy removal for maintenance or replacement.

The tubes are adapted to allow gas that has passed across the membranes but has not permeated the membranes to flow out of the tubes into the residue space. That is, the tubes are at least partially open to the residue space, normally at or near the permeate end. In this way, the tubes are not subjected to a large pressure difference across their walls. The tubes may be made from off-the-shelf seamless piping, for example, or may be manufactured to much lower pressure-rating than was required for the pressure tubes of prior art gas separation systems. The pressure-withstanding function is now fulfilled by the outer vessel or housing, within which the multiple tubes are contained.

As one example adaptation, each tube has at least one aperture or hole in its long, cylindrical surface. This aperture is usually positioned near the permeate end of the tubes. The aperture should be large enough that it does not present a significant resistance to gas flow. Typically, the aperture may be an inch or two in diameter, for example. As desired, one or multiple apertures in each tube may be used.

As another alternative, the tubes may be of shorter length than the distance between the tube sheets, so that there is a gap between the end of the tube and the tube sheet, through which gap the residue gas may flow into the residue space. In this case, the permeate-end tube sheet does not support the tubes directly, but only indirectly because the permeate pipes or extensions pass through it.

Yet other methods of allowing for gas flow from the interior of the tubes to the residue space, such as providing notches or slits in the end of the tube, so that only part of the tube contacts the tube sheet, and so on, will be apparent to those of skill in the art.

Whichever method is used, it is not necessary that the tubes make a gas-tight seal against the tube sheet at the permeate end. Most preferably, however, the tubes should at least contact the permeate-end tube sheet in such a manner that they are mechanically supported by the tube sheet. Convenient options include, but are not limited to, welding the tubes to the permeate-end tube sheet, or locating the tubes in a recess machined into the face of the permeate-end tube sheet that faces the residue space.

A basic embodiment of the invention, including the elements or main features of the assembly, is shown as a simplified schematic drawing of a lengthwise section in FIG. 1. Referring to this figure, the assembly is generally indicated by numeral 1, and includes a vessel, 2, containing a plurality of tubes, 8. The vessel or housing has an outer wall, 3, and an interior space, 4. Space 4 is divided by dividing means, 16 and 17, into three gas-tight spaces: a first end space, 5, a middle space, 6, and a second end space, 7. The dividing means typically take the form of perforated plates that also serve as tube sheets to support the tubes, but could also take any other form that separates spaces 5 and 6 in a gas-tight fashion.

Tubes 8 are mounted in the middle space, 6. Each tube has an interior, 18, containing at least one membrane module, 9. For clarity, the membrane module(s) are only indicated on the drawing in the center tube.

The vessel includes three ports, 10, 11, and 12, in the outer wall, one port accessing each gas-tight space within the vessel. The ports enable gas to flow between environments outside the vessel, such as pipes, and the spaces within the vessel.

The ends of the tubes are adapted to allow gas flow between the first space and the tubes by means generally indicated by numeral 13. Typically, means 13 is achieved simply by leaving the ends of the tubes open and providing openings of any convenient size, shape and number in dividing means 16.

The assembly is adapted by means, 14, to collect permeate gas from the membrane modules and allow this gas to flow into space 7. Typically, this is achieved by collecting the permeates from the modules within a tube into a single pipe emerging from the tube, which pipe transects dividing means 17. Many alternatives in terms of how the pipes are connected, and how they cut across means 17, are possible within the scope of the invention.

The assembly is further adapted by means, 15, to allow gas to flow between the interior of the tubes and the middle space 6. For clarity, this means is shown in the figure as an aperture or hole in the tube wall, but multiple openings or slits, one or more notches in the tube end, a gap between the tube and the tube sheet or dividing means, and the like, are within the adaptations contemplated by the inventors.

Figure 2:
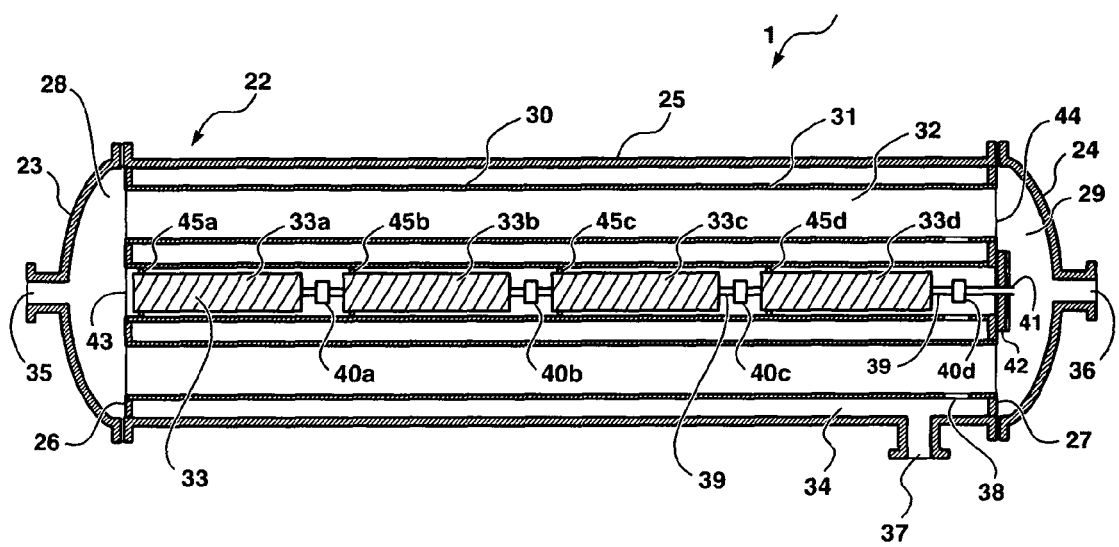
FIG. 2 is a schematic drawing of a preferred embodiment of the invention in a longitudinal central section.

A preferred embodiment of the invention is shown in longitudinal central section in FIG. 2. Referring to this figure, the assembly, again generally indicated by numeral 1, includes a housing or vessel, 22, containing a plurality of tubes, 30, in this case three tubes, of which only the top one is labeled to avoid long lead lines over other parts of the drawing.

The housing has a feed end, 23, a permeate end, 24, and a central portion, 25, shown as a cylindrical shell. In the drawing, the feed and permeate ends are shown in the most preferred form of removable flanged heads, connected to the body of the shell by bolts (not shown). However, any convenient means of connection of the ends is intended to be within the scope of this embodiment, and in some variants, discussed below, only one end need be removable.

A feed port, 35, is positioned in feed end 23; a permeate port, 36, is positioned in permeate end 24; and a residue port, 37, is positioned in the central portion or shell.

Each tube, 30, has a longitudinal tube wall, 31, and an interior, 32, containing gas-separation membranes, 33, shown here in the form of four membrane elements, 33a-d, arranged in line along the tube. The membrane elements each have a permeate pipe, 39, protruding from one or both ends, and the pipes are connected in line by connectors, 40a-c. An extension pipe, 41, is attached to the last permeate pipe in the series by connector 40d. The modules are sealed against the tube walls by annular seals 45a-d.

As in FIG. 1, for clarity, the membrane module(s) are only indicated on the drawing in the center tube. Three tubes are visible in the central longitudinal section of FIG. 2, representing an assembly with 7 tubes in total, shown in axial view as a layout diagram in FIG. 5, discussed below. Each tube has an aperture, 38, in wall 31, through which gas may flow between the tube interior and residue space 34.

A feed-end tube sheet, 26, is welded or otherwise mounted in the housing towards the feed end. This tube sheet is perforated by openings, 43, of about the same diameter as the ends of the tubes. At this end, the tubes and tube sheets are joined by adhesive or by welding, so that the tube sheet supports the tubes in spaced-apart relationship with each other.

A permeate-end tube sheet, 27, is welded or otherwise mounted in the housing towards the permeate end. This tube sheet is perforated by openings, 44, again of about the same diameter as the tubes. This tube sheet is thicker than the feed-end tube sheet, 26, because it has to withstand a greater pressure difference.

The tube sheets divide the interior of the housing into three separate gas-tight spaces: a first or feed gas space, 28, a second or permeate gas space, 29, and a central or residue gas space, 34, between the tube sheets, this space being partially occupied by the tubes, which are held in place by the tube sheets.

Extension pipe 41 projects through an opening 44 into permeate gas space 29. Welded or otherwise attached to the extension pipe is annular end-plate, 42, that makes a gas-tight seal against the tube sheet, 27, by screwing, bolting or the like.

In the embodiment shown in FIG. 2, both tube sheets have openings that correspond in width to the tube diameter, and both heads are drawn as removable. This arrangement provides the greatest flexibility for assembling the unit, either initially or after maintenance or repair, because the membrane elements can be loaded into the tubes, or taken out of the tubes, from either end.

If less flexibility is needed, this design can be simplified by permanently welding end 23 to the body of the vessel or manufacturing it as a unitary part of the body of the vessel, instead of as a removable head. The modules must then be loaded or unloaded from the permeate end only, but the manufacturing cost of the vessel may be reduced.

Figure 3:
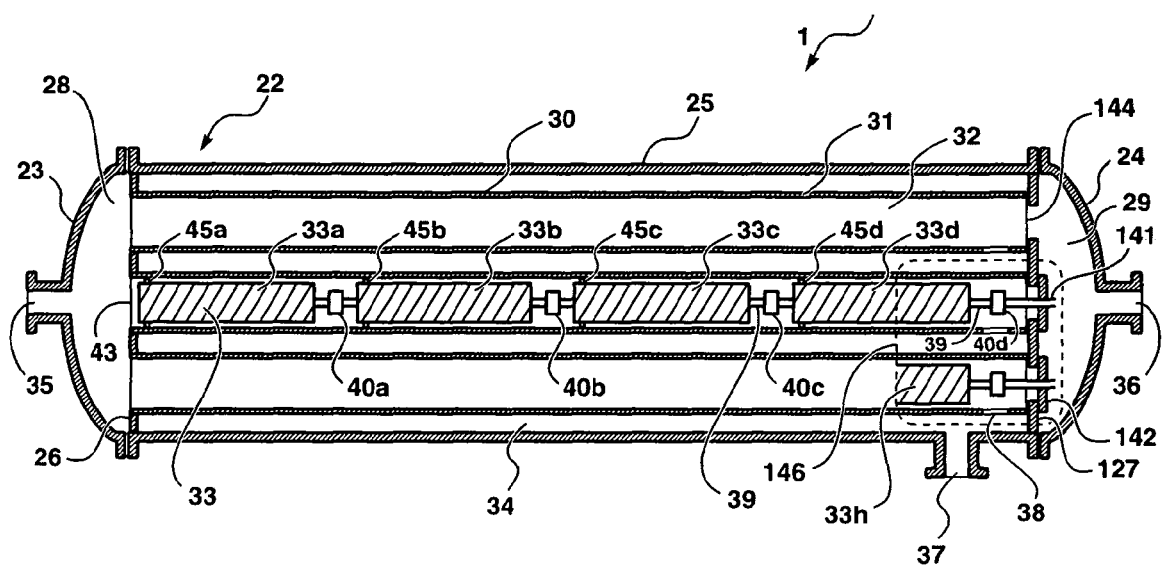
FIG. 3 is a schematic drawing of a most preferred embodiment of the invention in a longitudinal central section.

In a most preferred embodiment, smaller openings in the permeate-end tube sheet are used. FIG. 3 shows such an embodiment. Referring to this figure, elements identical to those of the FIG. 2 embodiment are numbered as in FIG. 2, and reference should be made to the description of FIG. 2 for explanation of those elements.

With reference to FIG. 3, it may be seen that permeate-end tube sheet, 127, has openings, 144, that are smaller in diameter than the diameter of tubes 31. Through these openings protrude extension pipes, 141, to which are attached end plates, 142. An expanded view of the portion of FIG. 3 within the area defined by dashed line 146 is shown in FIG. 4.

Figure 4:
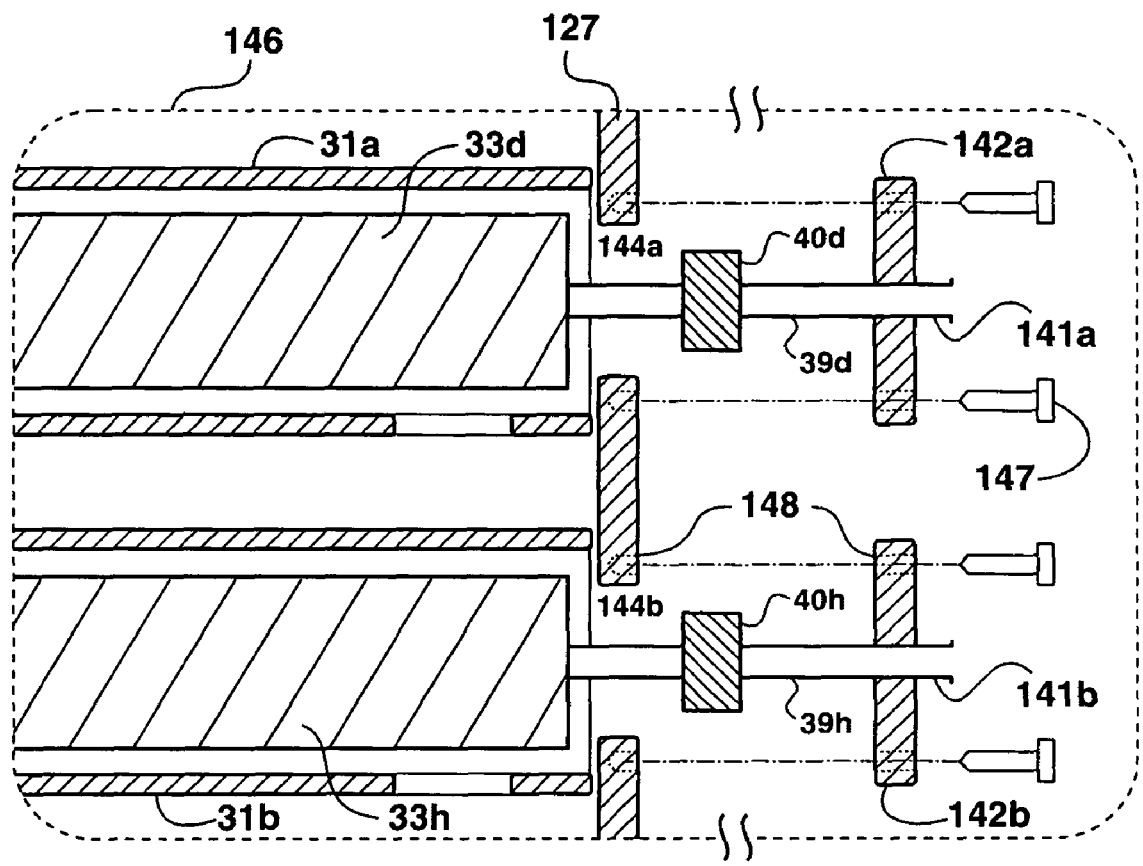
FIG. 4 is an expanded view of the portion of FIG. 3 within dashed line 146, showing the arrangement of elements at the permeate-end tube sheet.

Referring to FIG. 4, the expanded area within dashed line 146 includes the ends of two adjacent tubes, 31a and 31b, within the assembly. Tube 31a corresponds with the center tube in FIG. 3 and is assumed to contain membrane elements 33a through 33d. The end of membrane element 33d is shown. Likewise tube 31b is assumed to contain four membrane elements, and the end of the last membrane element, 33h, is shown.

Permeate-end tube sheet 127 is equipped with openings 144a and 144b. The openings are smaller than the tube diameters, but just large enough to enable connectors, 40d and 40h, to slide through easily. The connectors couple the ends of permeate collection pipes, 39d and 39h, to extension pipes, 141a and 141b.

Attached to the extension pipes are end plates, 142a and 142b. As can be seen, the end plates are considerably smaller in diameter than the end plates 42 in FIG. 2, and have a diameter no larger than the diameters of the tubes. Tube sheet 127 and end plates 142a and 142b are equipped with bolt holes 148, through which they may be are fastened together by bolts, 147. The bolt holes are positioned in the portion of the tube sheet that overlaps the ends of the tubes, not in the portion of the tube sheet between the tubes. O-rings or gaskets, not shown, may be used to make a gas-tight seal between the tube sheet and end plates.

In the embodiment shown in FIGS. 3 and 4, both heads are drawn as removable. To remove modules from a tube, 31a for example, the permeate head is removed, end plate 142a is unbolted and pulled away from the tube sheet to the position shown in FIG. 4. This exposes coupling 40d, which can be opened, so that extension pipe 141a and permeate pipe 39d can be separated. The feed head is also removed, and the modules are then pulled out through opening 43.

If a vessel with only one removable head is required, the design of FIG. 3 may be adapted by permanently welding end 24 to the body of the vessel or manufacturing it as a unitary part of the body of the vessel, instead of as a removable head. The bolted end-plate should then be replaced by a seal from which the permeate pipe or permeate pipe extension may be disconnected by pulling towards the feed end. For example, a bayonet-type seal, as described above, can be used. The modules may then be unloaded or reloaded simply by removing the feed head.

The arrangement shown in FIG. 4 enables the tubes to be extremely closely packed, as space is not needed in the solid portion of the tube sheet between the tubes for overlapping the end plates and securing the bolts. This provides for a higher packing efficiency of the tubes within the housing than would otherwise be possible, enabling a vessel of smaller overall diameter to be used.

FIGS. 2, 3 and 4 show specific embodiments that demonstrate the best mode contemplated by the inventors of realizing their invention. It will be seen that a number of permutations and combinations of the arrangement of features at the feed and permeate end is possible, and that a number of equivalent arrangements could readily be developed. These figures are intended to be representative, not limiting, of the invention.

Figure 5:
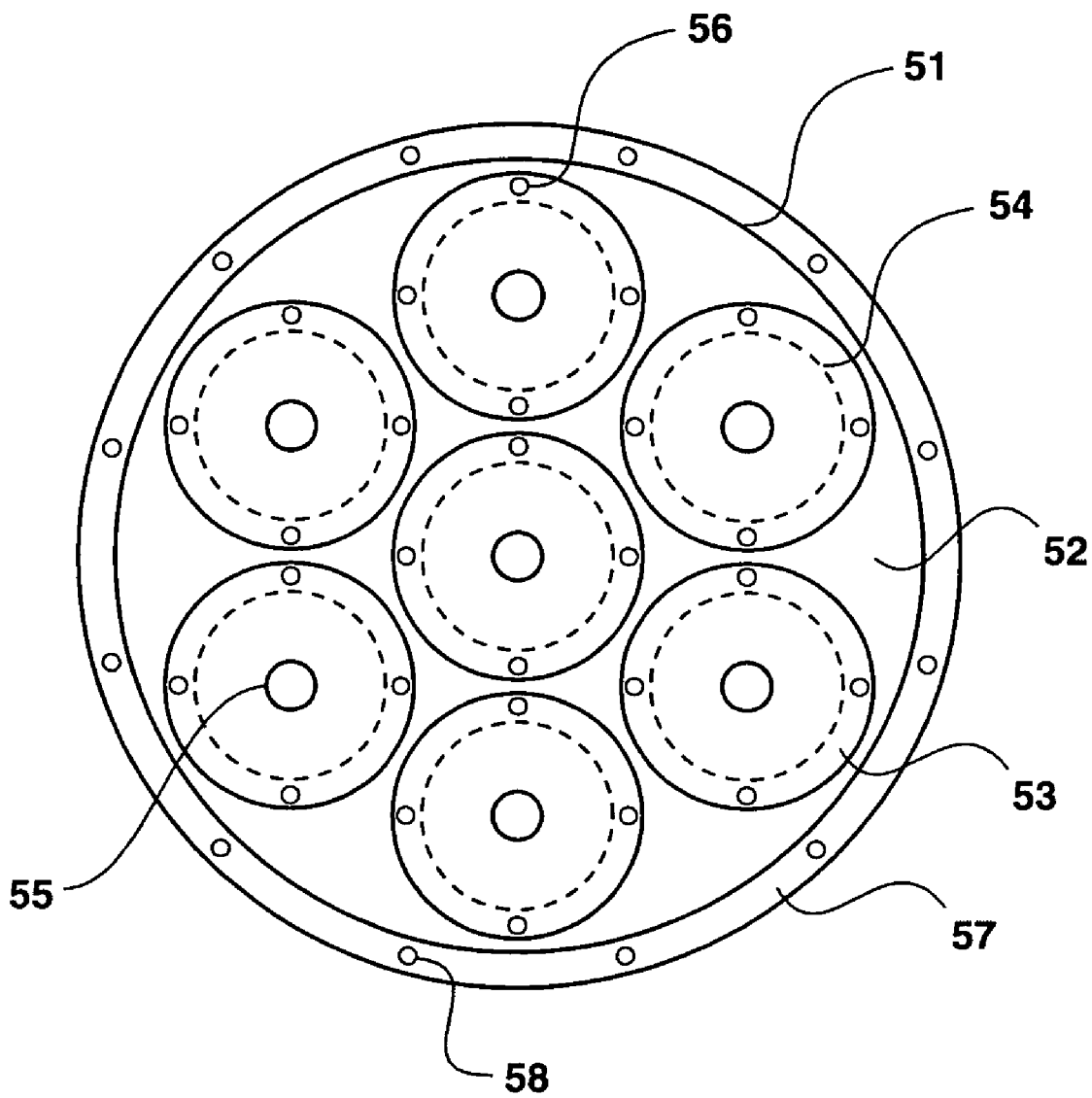
FIG. 5 is a schematic cross-sectional drawing showing attachment of the end plates in an embodiment in which the permeate-end tube sheet has openings of the same diameter as the tubes.

FIG. 5 shows a cross-sectional layout diagram of a preferred assembly containing seven tubes. The cross-section shows the placement of the end caps over the openings in the permeate-end tube as would be viewed looking at the permeate end of the assembly with the permeate end cap or head removed. In this embodiment, the openings in the tube sheet at the permeate end are the same size as the tubes.

Referring to this figure, flange, 57 at the end of the shell, 51, has bolt holes, 58, for attaching the head. Within the shell, the face of the permeate-end tube sheet, 52, and seven end plates, 53, can be seen. These end plates cover seven openings in the tube sheet, indicated by dashed circles, 54, that correspond in diameter to the ends of the tubes. The end plates are circular metal plates pierced by the permeate extension pipes, 55, and have diameters larger than the diameters of the tube openings that they cover. The plates have bolt holes, 56, positioned near their outer edges so as to overlap corresponding bolt holes in the tube sheet.

Figure 6:
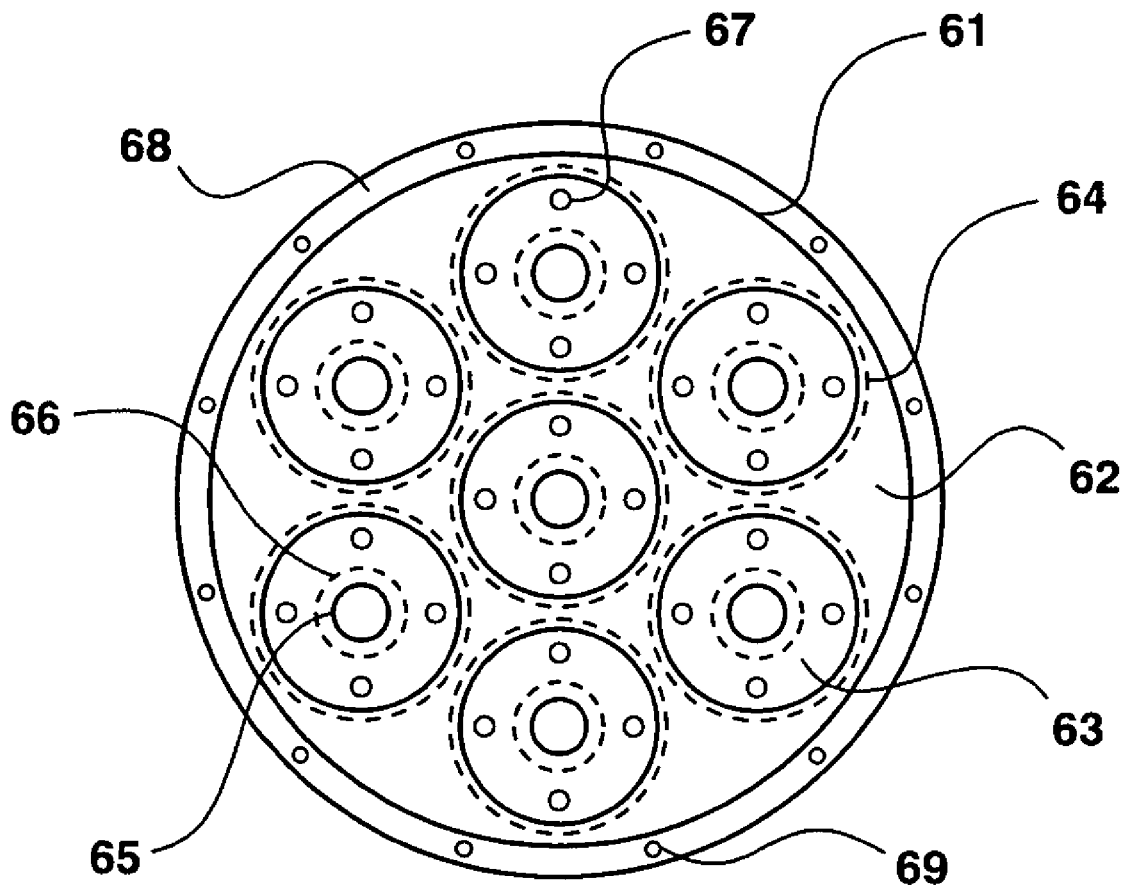
FIG. 6 is a schematic cross-sectional drawing showing attachment of the end plates in an embodiment in which the permeate-end tube sheet has openings of smaller diameter than the tubes.

FIG. 6 shows a cross-sectional layout diagram of an alternative assembly, also containing seven tubes. In this embodiment, the openings in the tube sheet at the permeate end are smaller than the tube diameters.

Referring to this figure, flange, 68 at the end of the shell, 61, has bolt holes, 69, for attaching the head. Within the shell, the face of the permeate-end tube sheet, 62, and seven end plates, 63, can be seen. These end plates cover seven openings in the tube sheet, indicated by dashed circles, 66. These openings are much smaller than the diameters of the ends of the tubes, indicated by dashed circles, 64. The end plates are pierced by permeate extension pipes, 65, and have diameters no larger than the diameters of the tube openings. The plates have bolt holes, 67, that overlap corresponding bolt holes in the tube sheet.

In FIGS. 5 and 6, the diameters of the tubes are assumed to be the same and the circles representing the position of the tube ends are drawn the same size. As can be seen by comparing the diameters of the vessels in the two figures, however, a much smaller vessel is needed for the embodiment shown in FIG. 6.

Figure 7:
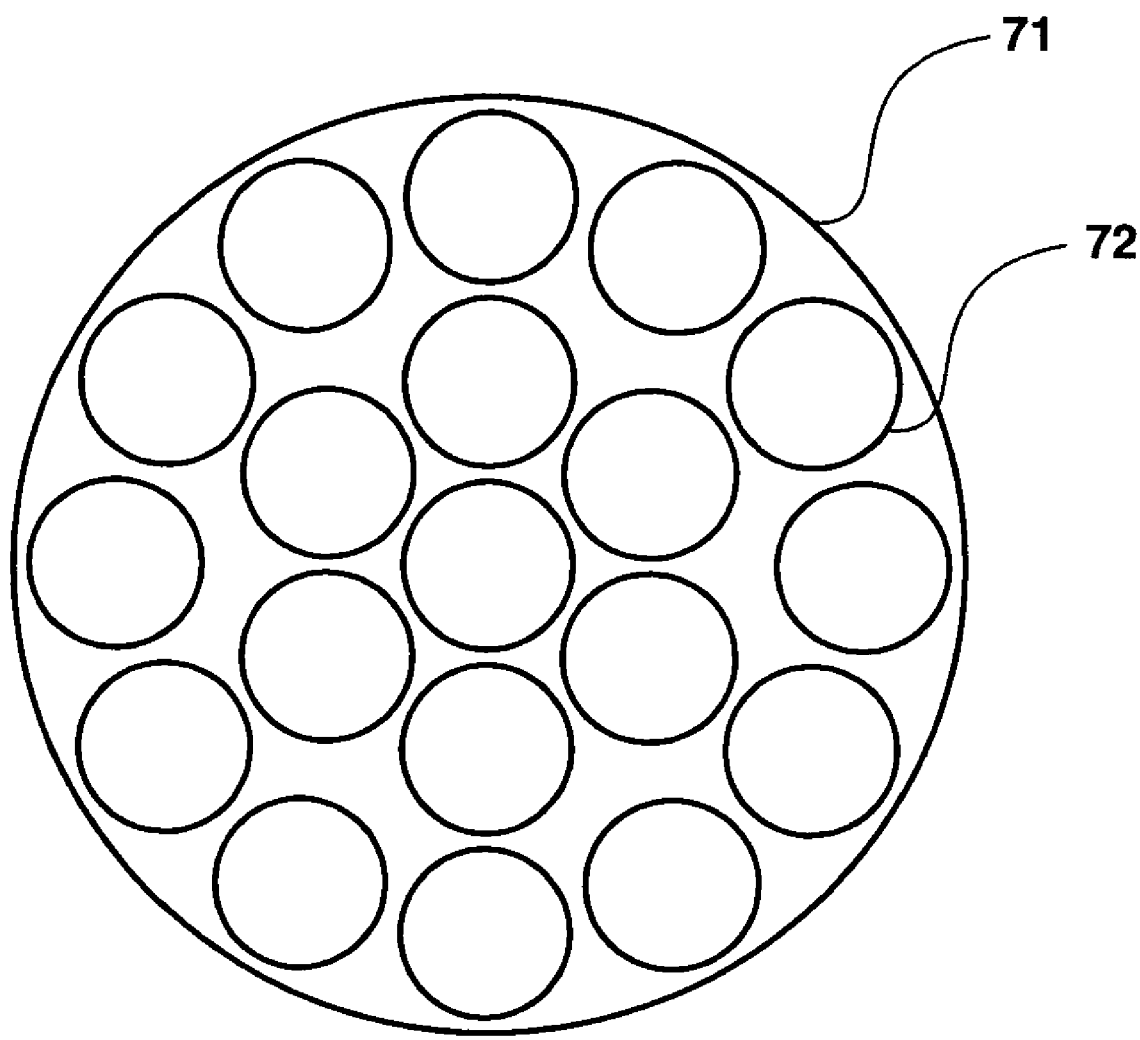
FIG. 7 is a schematic cross-sectional drawing showing placement of 19 tubes in the assembly.

FIG. 7 is a schematic cross-sectional drawing showing how the tubes could be arranged in a vessel, 71, having 19 tubes, 72.

Turning now to the features of the invention adapted particularly to low or high stage cut operation, the invention is further described as follows.

In general, the features of the assembly and the elements therein are as already described above. In addition, however, the assembly is equipped with means to pass feed gas from the feed gas space into the module-carrying tubes in such a way that parallel feed gas flow to multiple membrane elements within the module-carrying tube is provided. This configuration also provides for the parallel residue gas from each element to be collected and passed to the residue gas space.

A basic embodiment of the assembly adapted to these applications comprises:
(a) a plurality of module-carrying tubes each having a longitudinal tube wall and a tube interior containing a plurality of gas separation membrane elements aligned in series along the module-carrying tube;
(b) a housing containing the module-carrying tubes, the housing comprising a residue end, a permeate end and a central portion between the ends;
(c) a residue-end tube sheet mounted in the housing towards the residue end;
(d) a permeate-end tube sheet mounted in the housing towards the permeate end; the tube sheets dividing the interior of the housing into three separate gas-tight spaces: (i) a residue gas space at the residue end, (ii) a permeate gas space at the permeate end, and (iii) a feed gas space in the central portion between the residue and permeate spaces, and in which the module-carrying tubes are mounted in spaced-apart relationship with each other;
(e) a feed gas port in the central portion;
(f) a permeate gas port at the permeate end;
(g) a residue gas port at the residue end;
(h) first means to pass feed gas from the feed gas space into the module-carrying tubes in such a way that parallel feed gas flow to multiple membrane elements within the module-carrying tube is provided;
(i) second means to pass permeate gas to the permeate gas space;
(j) third means for residue gas to be collected and passed to the residue gas space.

Figure 9A:
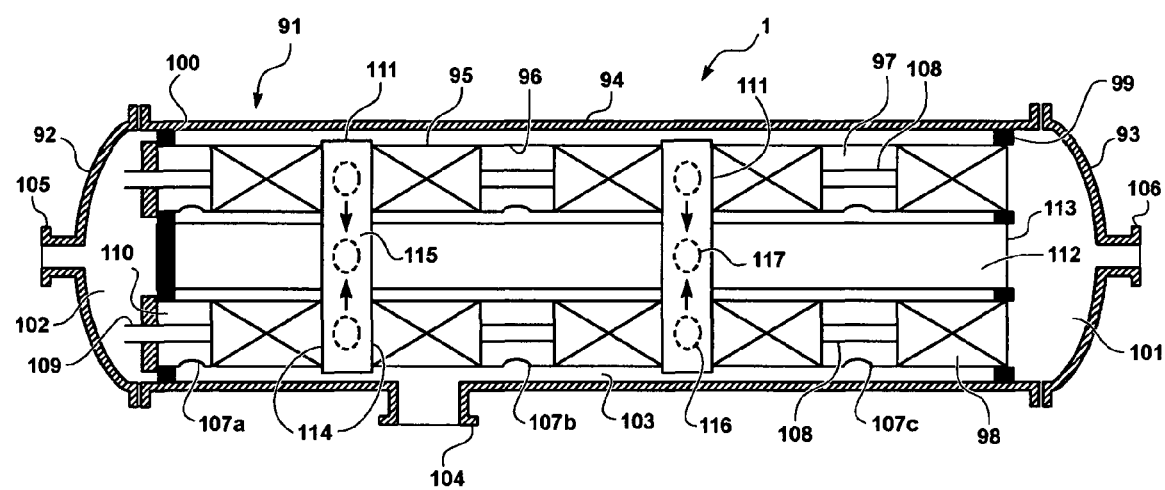
FIG. 9a is a schematic drawing showing a longitudinal section through the assembly of the invention as adapted for low stage cut operation.

A representative embodiment applicable for carrying out low stage cut separations is shown in FIG. 9a. In this and the figures that follow, certain standard components, such as connectors and seals, which have already been described with respect to the previously disclosed embodiments, have been omitted to improve clarity, although the skilled person will understand that they will be present in the apparatus. Likewise certain by now familiar options, such as the size of the permeate tube sheet openings, are not discussed, but are assumed to be understood by the skilled worker.

Referring to FIG. 9a, the assembly, again generally indicated by numeral 1, includes a housing or vessel, 91, containing a plurality of module-carrying tubes, 95, and a residue collection tube, 112. In the drawing, the residue collection tube is shown as the center tube, with the module-carrying tubes arranged around the periphery.

The housing has a permeate end, 92, a residue end, 93, and a central portion or shell, 94. In the drawing, the residue and permeate ends are both shown as removable flanged heads, although this is optional, and only one end need be open.

A feed port, 104, is positioned in the central portion or shell; a permeate port, 105, is positioned in permeate end 92; and a residue port, 106, is positioned in residue end 93.

Each module-carrying tube, 95, has a longitudinal tube wall, 96, and a tube interior, 97, containing gas-separation membrane elements, 98, in this representative case five elements, arranged in line along the tube. The membrane elements each have a permeate collection pipe, 108, protruding from one or both ends, and the pipes are connected in line. A permeate extension pipe, 109, is attached to the last permeate pipe in the series, and protrudes into the permeate gas space, 102.

A residue-end tube sheet, 99, is welded or otherwise mounted in the housing towards the residue end. This tube sheet is perforated by openings, 113, of about the same diameter as the ends of the tubes.

A permeate-end tube sheet, 100, is welded or otherwise mounted in the housing towards the permeate end. This tube sheet is perforated by openings, 110, again of about the same diameter as the tubes. This tube sheet is thicker than the residue-end tube sheet, 99, because it has to withstand a greater pressure difference.

The tube sheets divide the interior of the housing into three separate gas-tight spaces: a residue gas space, 101, a permeate gas space, 102, and a central or feed gas space, 103, between the tube sheets, this space being partially occupied by the tubes, which are held in place by the tube sheets.

Feed gas entering the housing is directed in parallel to multiple membrane modules within each tube, and preferably is directed in parallel to all membrane elements in all tubes. In FIG. 9a, this result is accomplished by means of three apertures, 107a, b and c, positioned along the module-carrying tubes as shown. Thus, aperture 107a gives feed access to the leftmost element, 107b gives access to the next two elements in line, and 107c gives access to the two elements to the right.

A single aperture in each position as shown is the simplest means to feed gas to the membrane elements. Other equivalent means include multiple perforations around the tube at each position.

Mounted on the tubes and perforated by the tubes are one or more residue collection manifolds, 111. The manifolds are shown in the figure in the generally preferred form of cylindrical perforated drums, having opposed faces, 114, and an annular wall, 115. The manifold may take any other convenient shape, subject only to its ability to provide a contained volume through which the tubes can pass. For example, the manifold might take the form of a sphere or an ellipsoid.

The manifolds are exposed only to the pressure drop, if any between the feed and residue gases, so may be made of relatively lightweight materials, such as those used to make the tubes.

Preferably, the manifolds and tubes can slide against one another to facilitate insertion and removal of components within the assembly. Any method to achieve this may be used; we prefer that the tube outside diameters be slightly smaller than the openings in the manifold through which they are to be pushed, with the gap sealed by an elastomeric or similar seal that grips the tubes in gas-tight manner.

The module-carrying tubes are equipped with openings, 116, that lie within the residue collection manifolds when the assembly is complete. Likewise, the residue collection tube is equipped with similar openings, 117.

When the assembly is in use, the positioning of these openings allows for residue gas to be collected from each membrane element and directed into the residue collection tube. The end of the collection tube is open to the residue gas space, permitting collected gas to flow into that space and out of the assembly through the residue gas port.

Figure 10:
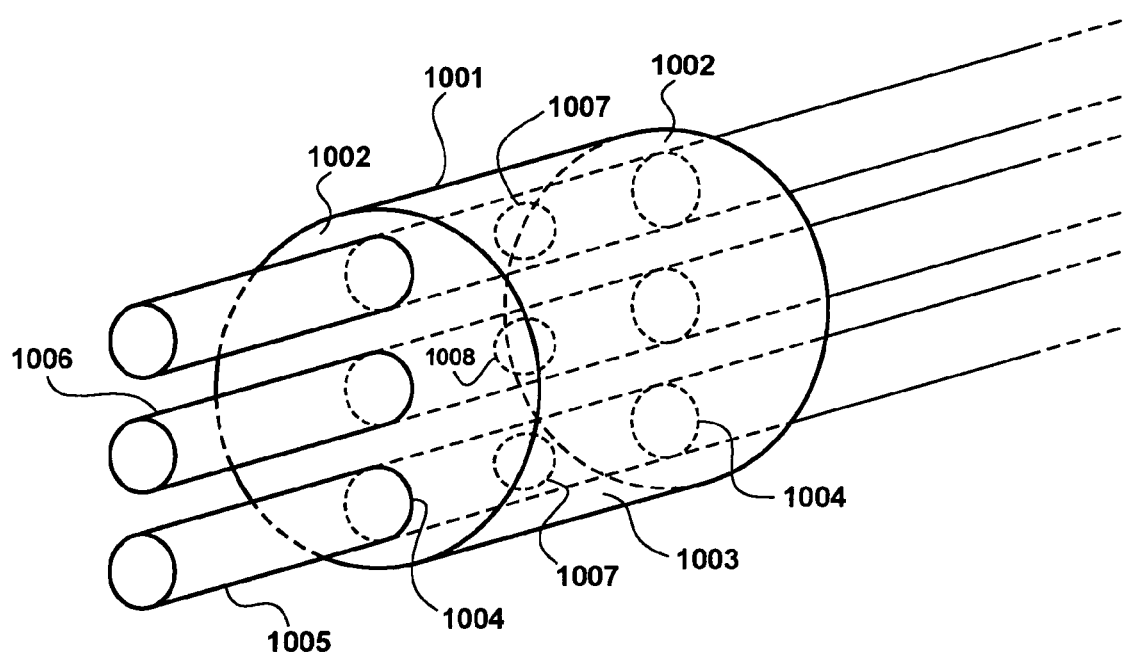
FIG. 10 is a representation of a manifold, showing the positioning of tubes through the manifold, applicable to a low or high stage configuration.

The arrangement of the tubes and manifold is shown in simplified form as a three dimensional representation in FIG. 10. Referring to this figure, manifold, 1001, has opposed faces, 1002, and an annular wall, 1003.

The manifold is equipped with oppositely aligned openings, 1004, through which the module-carrying tubes, 1005, and the residue collection tube, 1006, are passed. Within the manifold volume, the module-carrying tubes have openings, 1007, and the residue collection tube has an opening, 1008, through which gas may enter and leave the manifold.

Figure 11:
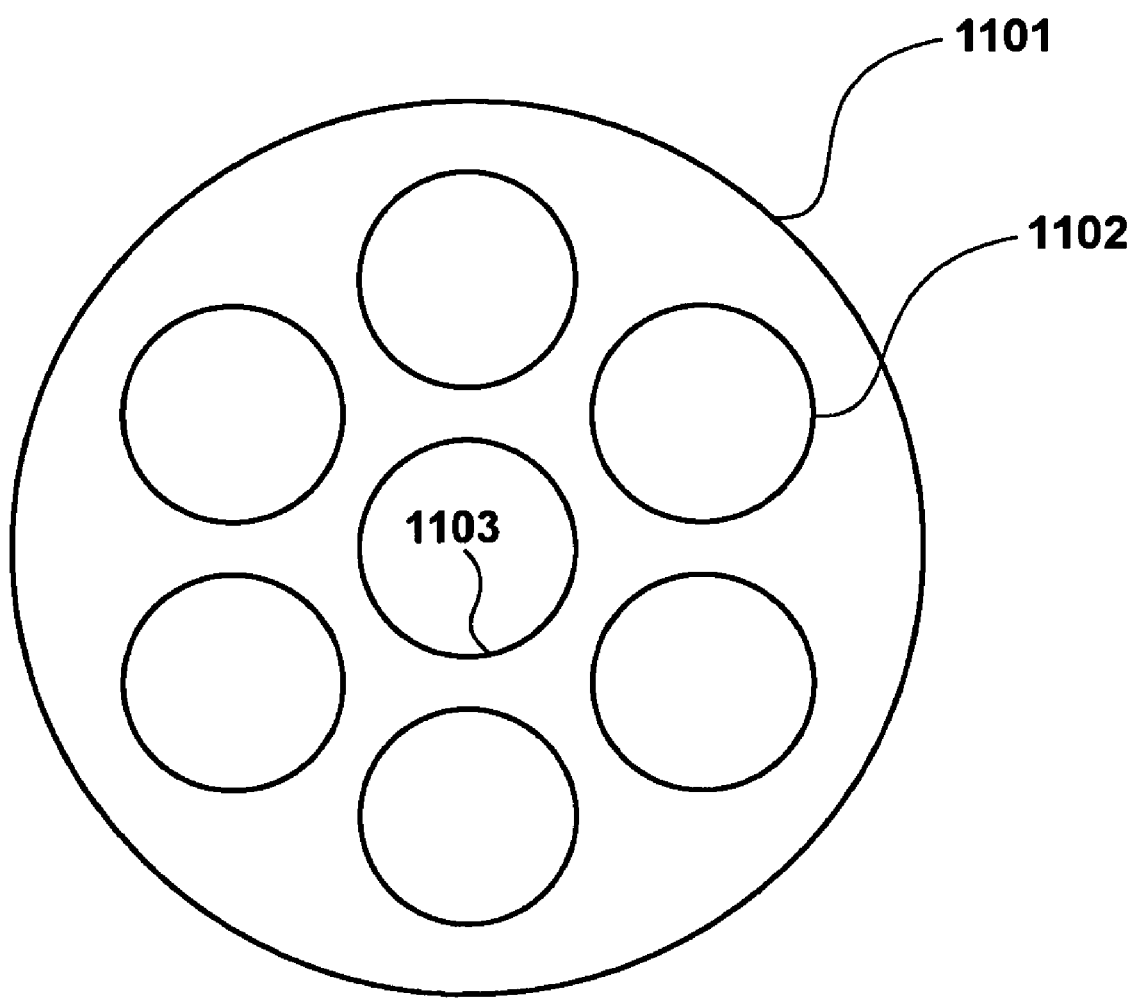
FIG. 11 is a schematic cross-sectional drawing showing one face of a residue collection manifold or a residue tube sheet, adapted with openings for the tubes.

The same arrangement is shown in cross section in FIG. 11. Referring to this figure, one face, 1101 of the manifold is visible, and is perforated by openings, 1102, for the module-carrying tubes, and opening, 1103, for the residue collection tube. The figure shows a configuration with six module-carrying tubes; as with the previously described embodiments, any number of tubes may be contained in the housing.

The same figure can represent the end view of the tube sheets, with numeral 1101 representing the face of the tube sheet.

Figure 12:
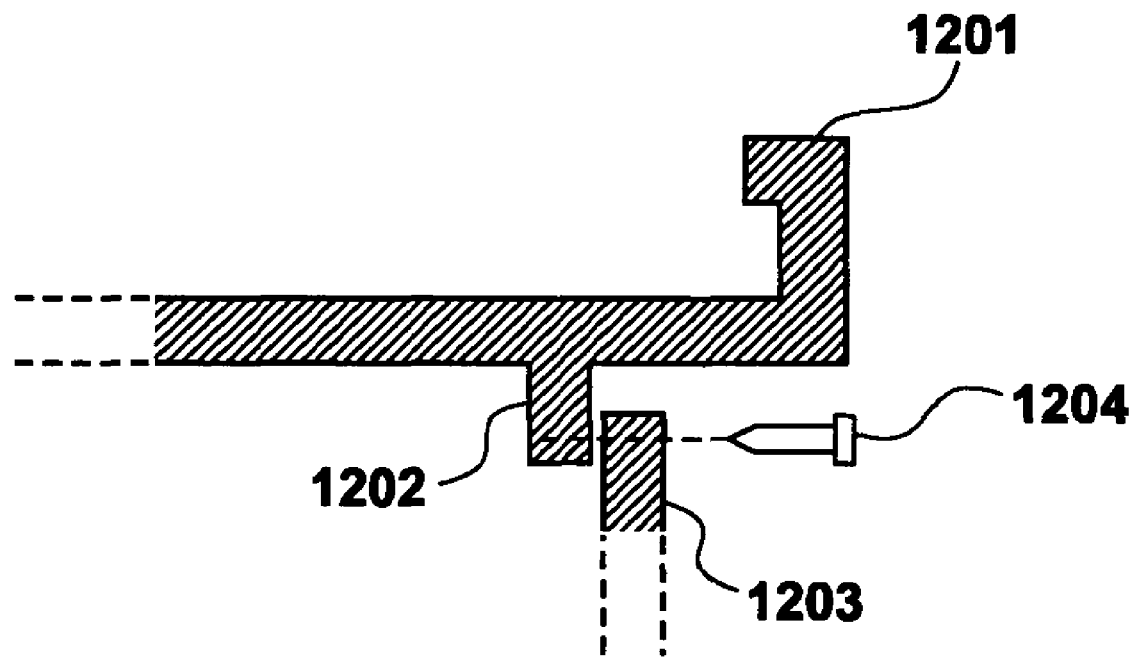
FIG. 12 is a schematic cross-sectional drawing showing reversible attachment of a tube sheet to the housing.

As an alternative to welding the tube sheets to the inside of the housing, one or both of the tube sheets may be attached in a reversible manner, thereby facilitating removal of the tubes and manifolds, if desired. A simple option for a removable tube sheet is shown in FIG. 12.

Referring to this figure, shell, 1201 is equipped with a lip or flange, 1202, projecting a small distance into the housing interior. Tube sheet, 1203, is bolted to the flange by bolt, 1204.

Figure 13A:
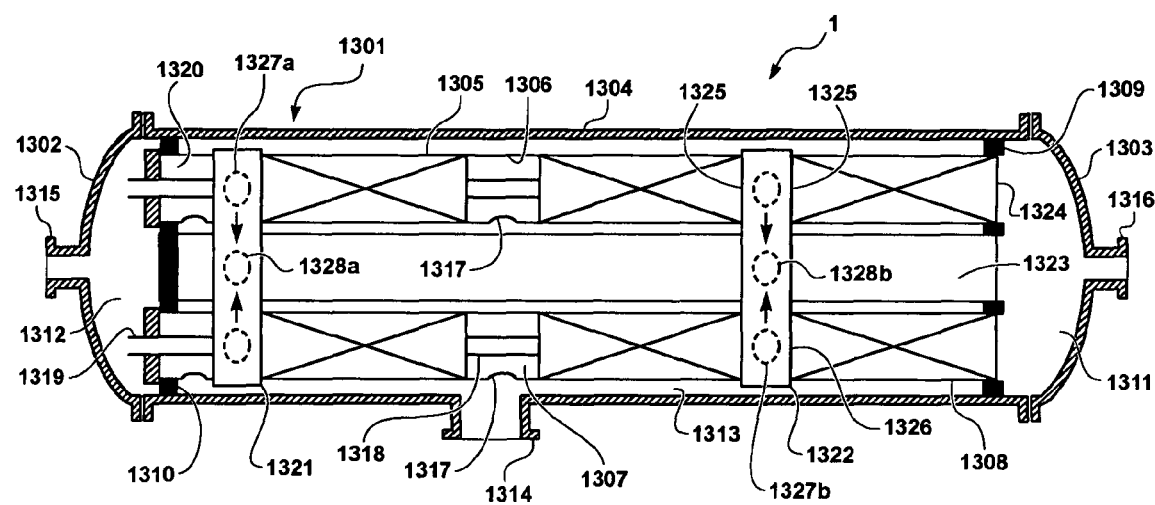
FIG. 13a is a schematic drawing showing a longitudinal section through the assembly of the invention as adapted for high stage cut operation, and having two membrane elements per tube in the first membrane separation step.

A representative embodiment applicable for carrying out high stage cut separations is shown in FIG. 13a. Referring to this figure, the assembly, again generally indicated by numeral 1, includes a housing or vessel, 1301, containing a plurality of module-carrying tubes, 1305, and an intermediate gas flow tube, 1323.

The housing has a permeate end, 1302, a residue end, 1303, and a central portion or shell, 1304. A feed port, 1314, is positioned in the central portion or shell; a permeate port, 1315, is positioned in permeate end 1302; and a residue port, 1316, is positioned in residue end 1303.

Each module-carrying tube, 1305, has a longitudinal tube wall, 1306, and a tube interior, 1307, containing gas-separation membrane elements, 1308, in this representative case three elements, arranged in line along the tube. The membrane elements each have a permeate collection pipe, 1318, protruding from one or both ends, and the pipes are connected in line. A permeate extension pipe, 1319, is attached to the last permeate pipe in the series, and protrudes into the permeate gas space, 1312.

A residue-end tube sheet, 1309, is welded or otherwise mounted in the housing towards the residue end, and has openings, 1324, to carry and support the tubes.

A permeate-end tube sheet, 1310, is welded or otherwise mounted in the housing towards the permeate end. This tube sheet is perforated by openings, 1320, again of about the same diameter as the tubes. This tube sheet is thicker than the residue-end tube sheet, 1309, because it has to withstand a greater pressure difference.

The tube sheets divide the interior of the housing into three separate gas-tight spaces: a residue gas space, 1311, a permeate gas space, 1312, and a central or feed gas space, 1313.

Feed gas entering the housing is directed in parallel to multiple membrane modules within each tube by means of apertures 1317. The high stage cut design differs from the low stage cut design in that the membrane elements within a tube are divided into a first membrane separation step and a second membrane separation step.

For example, if a tube contains three elements, as shown in the figure, then two elements constitute the first membrane separation step and one element constitutes the second membrane separation step. More generally, there may be n membrane elements in the first step, and m membrane elements in the second step, where m and n are positive integers, and n is greater than m.

Apertures 1317 distribute feed gas in parallel to the n membrane elements in each tube that together form the first separation step. Residue from these elements is collected and directed to the elements that form the second separation step.

To collect the gas, the assembly is equipped with one or more intermediate residue gas collection manifolds, 1321. Design and arrangement choices for these manifolds are the same as for the residue collection manifolds of FIG. 9a.

In the design of FIG. 13a, the center tube is designated the intermediate gas flow tube. This tube has an opening, 1328a, within the manifold through which gas can pass from the manifold into the tube.

As in FIG. 9a, the module-carrying tubes are also equipped with openings, 1327a, contained within the intermediate gas collection manifold through which gas can pass into the manifold.

The assembly is also equipped with at least one intermediate gas distribution manifold, 1322, through which collected intermediate residue gas may pass as feed to the second membrane separation step modules, by means of openings 1328b and 1327b. Design and arrangement choices for these manifolds are the same as for the other manifolds already described, with the manifolds preferably having a generally drum shape, with opposing faces, 1325, and an annular wall, 1326.

In this design, the module-carrying tubes are open at the residue end, so that residue gas that has passed through the modules of the second membrane separation step can simply pass out of the open ends into the residue gas space.

Figure 14A:
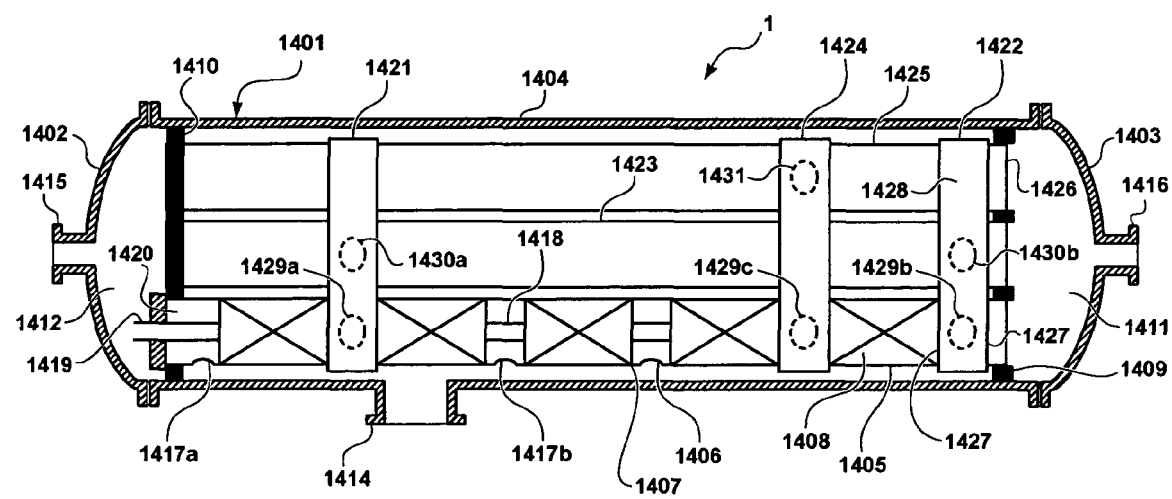
FIG. 14a is a schematic drawing showing a longitudinal section through the assembly of the invention as adapted for high stage cut operation, and having three membrane elements per tube in the first membrane separation step.

A second representative embodiment applicable for carrying out high stage cut separations is shown in FIG. 14a. In this case, there are three modules per tube in the first membrane separation step, and two in the second.

Referring to this figure, the assembly, again generally indicated by numeral 1, includes a housing or vessel, 1401, containing a plurality of module-carrying tubes, 1405.

The housing has a permeate end, 1402, a residue end, 1403, and a central portion or shell, 1404. A feed port, 1414, is positioned in the central portion or shell; a permeate port, 1415, is positioned in permeate end 1402; and a residue port, 1416, is positioned in residue end 1403.

Each module-carrying tube, 1405, has a longitudinal tube wall, 1406, and a tube interior, 1407, containing gas-separation membrane elements, 1408, in this case five elements, arranged in line along the tube. The membrane elements each have a permeate collection pipe, 1418, protruding from one or both ends, and the pipes are connected in line. A permeate extension pipe, 1419, is attached to the last permeate pipe in the series, and protrudes into the permeate gas space, 1412.

A residue-end tube sheet, 1409, is welded or otherwise mounted in the housing towards the residue end, and has openings, 1426, to carry and support the tubes.

A permeate-end tube sheet, 1410, is welded or otherwise mounted in the housing towards the permeate end. This tube sheet is perforated by openings, 1420, again of about the same diameter as the tubes.

The tube sheets divide the interior of the housing into three separate gas-tight spaces: a residue gas space, 1411, a permeate gas space, 1412, and a central or feed gas space, 1413.

Feed gas entering the housing is directed in parallel to three membrane modules within each tube by means of apertures 1417a and 1417b. Residue from these elements is collected and directed to the elements that form the second separation step.

To collect the gas, the assembly is equipped with one or more intermediate residue gas collection manifolds, 1421. Design and arrangement choices for these manifolds are the same as for the residue collection manifolds of FIG. 9a.

The intermediate gas collection manifolds collect gas from the module-carrying tubes by means of openings, 1429*a*, and direct the gas to intermediate gas flow tube, 1423, by means of openings, 1430*a*.

The assembly is also equipped with at least one intermediate gas distribution manifold, 1422, through which collected intermediate residue gas may pass as feed to the second membrane separation step modules, by means of openings 1430*b* and 1429*b*. Design and arrangement choices for these manifolds are the same as for the other manifolds already described, with the manifolds preferably having a generally drum shape, with opposing faces, 1427, and an annular wall, 1428.

In this design, the second membrane separation step has multiple membrane elements, so another manifold, 1424, designated the second step residue collection manifold, is needed. This manifold collects gas from the second step elements through openings, 1429*c*, and delivers the gas by means of opening, 1431, to residue collection tube, 1425, from which gas passes to the residue gas space via tube sheet opening, 1426.

As can be seen, in this embodiment, two of the tubes within the housing are used for gas collection and distribution; the remaining tubes are module-carrying tubes.

In a final aspect, the invention is a gas separation process for carrying out a low stage cut or a high stage cut gas separation process. In this aspect, the invention comprises:
 (a) introducing a feed gas mixture into the feed gas port allowing the feed gas mixture to flow from the feed gas space into the module-carrying tubes and through the gas separation membrane elements, each element containing a membrane having a feed side and a permeate side;
 (b) providing a driving force to induce permeation of a first portion of the feed gas mixture from the feed side to the permeate side;
 (c) withdrawing from the permeate gas port a permeate gas stream comprising the first portion;
 (d) withdrawing from the residue gas port a residue gas stream comprising a second portion of the feed gas mixture that has not permeated the membrane.

Figure 9B:
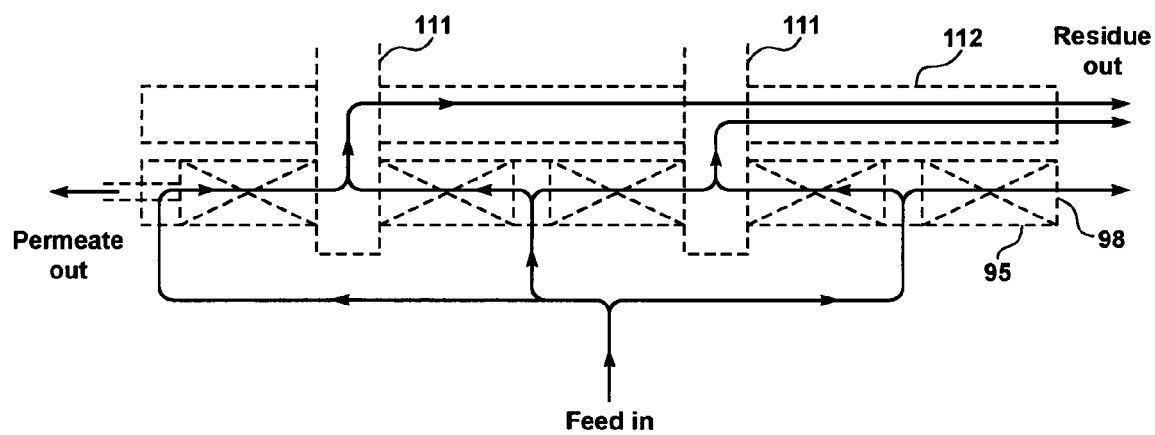

FIG. 9*b* illustrates the process as it relates to a low stage cut separation. Referring to this figure, a limited number of components of FIG. 9*a* are shown dashed outline for clarity. Feed gas flows as indicated to all five membrane elements, 98, within tube, 95. Gas flows across the membranes within the elements and is separated into two portions: a permeate gas stream, that exits through the permeate collection tubes as indicated by the arrow, and a residue gas stream.

Residue gas is collected in the manifolds, 111, and passed to the residue collection tube, 112, whence it is withdrawn as indicated.

A driving force for transmembrane permeation is provided, usually by ensuring that there is a pressure difference between the feed and permeate sides of the membranes. This may involve compressing the feed gas, and/or drawing the permeate gas through a vacuum pump, for example, or any other method known in the art.

Figure 13B:
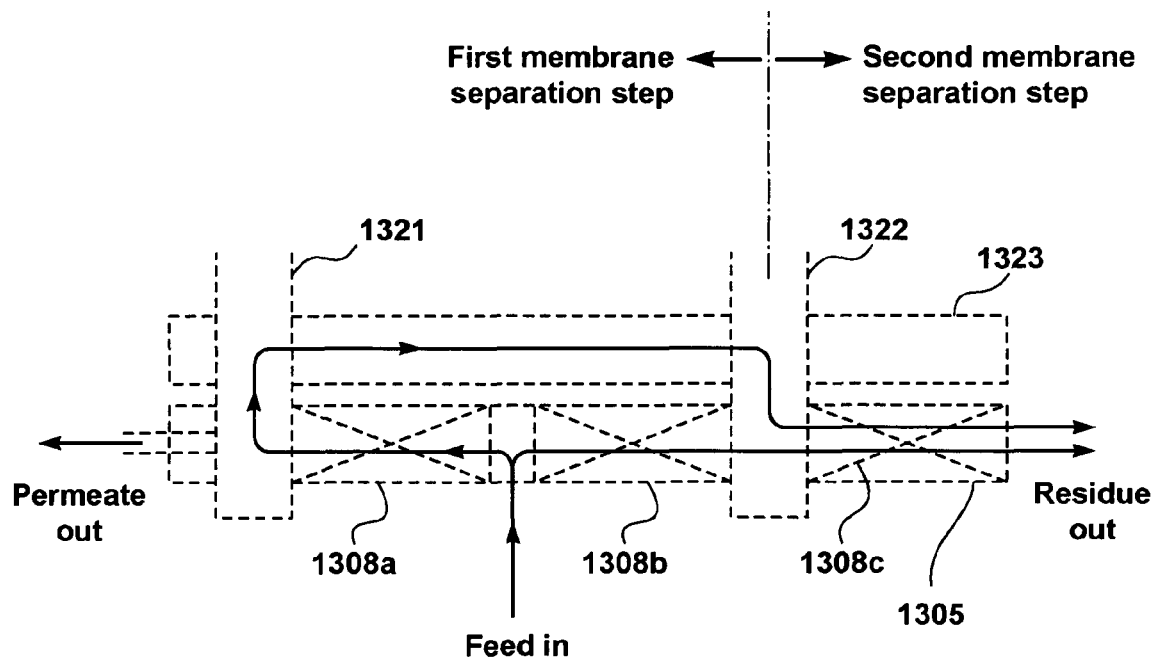

FIG. 13*b* illustrates the process as it relates to a high stage cut separation using the assembly of FIG. 13*a*. Referring to this figure, feed gas flows as indicated to the two elements, 1308*a* and 1308*b*, that form the first membrane separation step. Gas flows across the membranes within the elements and is separated into two portions: a permeate gas stream, that exits through the permeate collection tubes as indicated by the arrow, and a residue gas stream.

Residue gas from element 1307*a* is collected in manifold, 1321, and passed to the intermediate gas flow tube, 1323. From this tube, gas flows to manifold, 1322, and then to second step module, 1308*c*. Gas from element 1308*b* does not pass through the intermediate gas flow tube, but can flow directly out of element 1308*b* into element 1308*c* through the module-carrying tube.

Residue gas from the second membrane separation step is withdrawn as indicated. Permeate gas from the second step passes into the connected permeate collection tubes and flows out to the left with the gas from the first separation step.

Figure 14B:
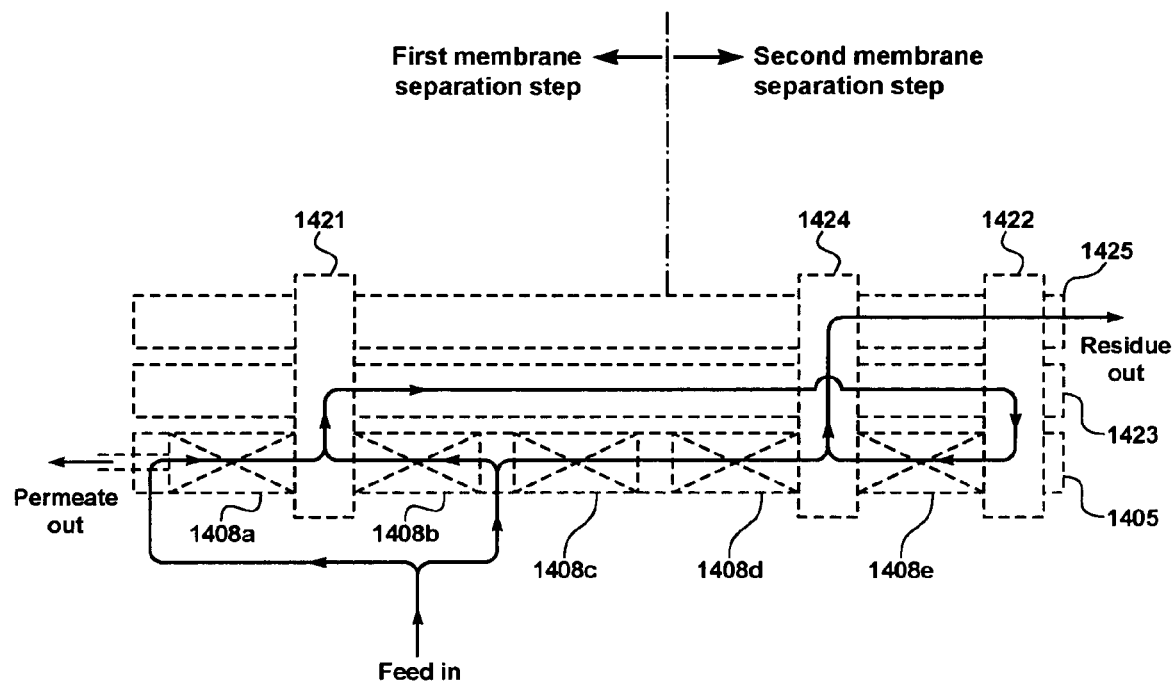

FIG. 14*b* illustrates the process as it relates to a high stage cut separation using the assembly of FIG. 14*a*. Referring to this figure, feed gas flows as indicated to the three elements, 1408*a, b* and *c*, that form the first membrane separation step. Gas flows across the membranes within the elements and is separated into two portions: a permeate gas stream, that exits through the permeate collection tubes as indicated by the arrow, and a residue gas stream.

Residue gas from elements 1407*a* and *b* is collected in manifold, 1421, and passed to the intermediate gas flow tube, 1423. From this tube, gas flows to manifold, 1422, and then to second step modules, 1408*e*. Gas from element 1408*c* does not pass through the intermediate gas flow tube, but can flow directly out of element 1408*c* into element 1408*d* through the module-carrying tube.

Residue gas from the second membrane separation step is collected in manifold, 1424, and withdrawn through residue collection tube, 1425, as indicated. Permeate gas from the second step passes into the connected permeate collection tubes ands flows out to the left with the gas from the first separation step.

The process as described above may be used to separate any gas or gases from any gas mixture. It is believed that the process is particularly useful for natural gas treatment, such as to separate carbon dioxide, nitrogen or hydrocarbons from natural gas.

The invention is now illustrated in further detail by specific examples. These examples are intended to further clarify the invention, and are not intended to limit the scope in any way.

EXAMPLES

Example 1

Comparison of Skid Size Requirements for Gas Separation System Using Conventional Pressure Tubes, Seven-Tube Vessels and 19-Tube Vessels An approximate comparison was made of the skid size that is needed to provide sufficient membrane capacity for a system constructed using prior art pressure tubes or the multi-tube pressure vessels of the invention.

Figure 8:
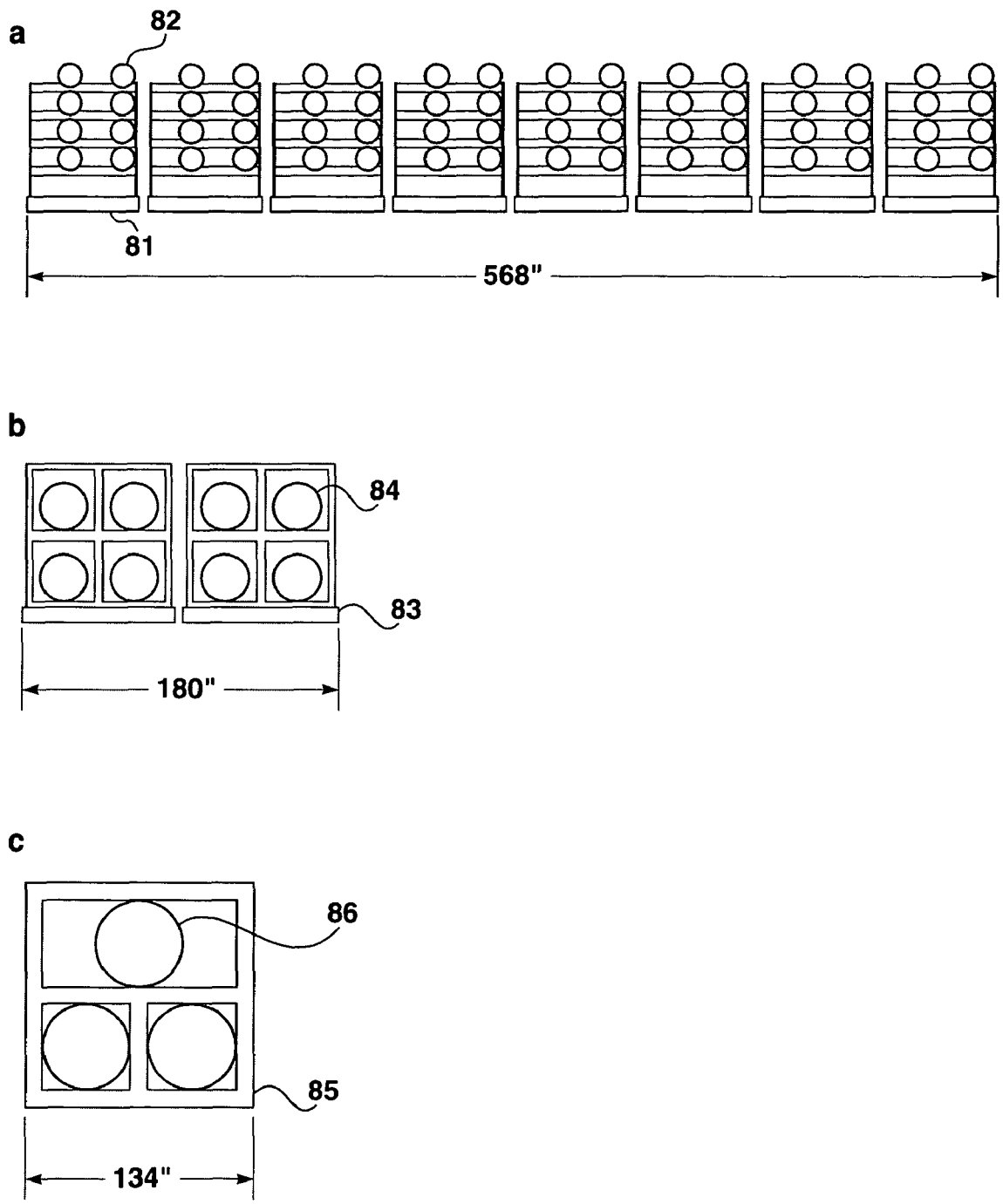
FIG. 8 is a diagram comparing the space requirements for three gas-separations assemblies.

FIG. 8 illustrates the difference in footprint requirements for a gas-separation system using a conventional pressure vessel, a seven-tube vessel and a 19-tube vessel. The system was assumed to need about 4,500 to 5,000 $m^2$ of membrane area in the form of spiral-wound modules and to be operating at a feed pressure of about 500 psi. In each case, the membrane modules are arranged in an end-to-end series of 4 modules inside a tube, and the length of the skid is about 23 feet. The difference in size is evident in the different widths.

FIG. 8 (*a*) shows a conventional configuration, not in accordance with the invention. The tube that contains the modules also serves as the pressure vessel so that each pressure vessel contains four modules. The system requires eight skids, 81, each holding eight pressure vessels, 82. The configuration as shown in FIG. 8(*a*) uses 256 modules and the total amount of membrane area is 5,120 m². Each skid is about six feet wide. The total area or footprint required per skid is 6×23 or about 140 ft². The total footprint required for 5,120 m² of membrane is thus 140×8 or 1,120 ft².

FIG. 8 (*b*) shows a seven-tube pressure vessel skid configuration in accordance with the invention. The system requires two skids, 83, each holding four pressure vessels, 84. Each pressure vessel contains seven tubes. The configuration as shown in FIG. 8 (*b*) uses 224 modules and the total amount of membrane area is 4,480 m². Each skid is 7.5 feet wide with a footprint of 7.5×23 or about 170 ft². The total footprint required for 4,480 m² of membrane is thus 170×2 or 340 ft². Compared with FIG. 8 (*a*) above, the membrane system uses about one third the footprint required for the conventional system.

FIG. 8 (*c*) shows a 19-tube pressure vessel skid configuration in accordance with the invention. The system requires one skid, 85, using 3 pressure vessels, 86. Each pressure vessel contains 19 tubes. The configuration as shown in FIG. 8 (*c*) uses 228 modules and the total amount of membrane area for this configuration is 4,560 m². The skid is 11 feet wide with a footprint of 11×23 or about 250 ft². The total footprint required for 4,560 m² of membrane is thus 250 ft². Compared with FIG. 8 (*a*) above, the membrane system uses under one quarter the footprint required for the conventional system.

As can be seen, multi-tube vessels substantially reduce the footprint size of the system. The weight is also reduced.

Example 2

Complexity Comparison of Conventional Pressure Tube, 7-Tube Vessel and 19-Tube Vessel Skid Configurations Table 1 compares some properties of standard skid configurations containing roughly comparable membrane area as illustrated in FIG. 8. Using the number of connection features (such as flanges) and tubes as one measure of complexity, it can be seen that seven- or 19-tube pressure vessels greatly decrease the complexity of the skid configuration.

TABLE 1

| Vessel Type | Number of skids | Vessels per skid | Total Vessels | Total footprint (ft²) | Total membrane area (m²) | Total Flanges |
|---|---|---|---|---|---|---|
| Conventional | 8 | 8 | 64 | 1,120 | 5,120 | 192 |
| 7-tube | 2 | 4 | 8 | 340 | 4,480 | 24 |
| 19-tube | 1 | 3 | 3 | 250 | 4,560 | 9 |

Example 3

Comparison of Vessel Diameters for Pressure Vessels Containing Seven Tubes

A calculation was performed to compare the pressure vessel diameter needed to house seven tubes according to the arrangements shown in FIGS. 5 and 6. Both drawings are cross-sectional schematics showing the face of a tube sheet in a pressure vessel operating at about 700 psi. For both embodiments, the tubes within the pressure vessel are 8 inches in diameter. The schematics in FIGS. 5 and 6 show that it takes three tubes to span to the diameter of the pressure vessel. A tolerance of one quarter to one eighth inch is allowed for the end-plate diameters.

FIG. 5 shows a tube sheet at the permeate end of a pressure vessel For the embodiment as shown in FIG. 5, the tube sheet, 52, has openings that are eight inches in diameter, 54, and end plates, 53, that are 13 inches in diameter. The openings are large enough to allow tubes to pass through the tube sheet.

For the embodiment shown in FIG. 6, the tube sheet, 62, has openings that are five and one half inches in diameter, 66, and end plates, 63, that are 9 inches in diameter. The openings are large enough to allow a permeate pipe to extend through the holes, but the eight inch tubes may not pass through.

The vessel diameter in each case was determined by taking the above measurements, including tolerances, and adding them up across the diameter of the vessel. The results of these calculations are summarized in Table 2 below.

TABLE 2

(seven-tube vessel)

| Permeate-end configuration | FIG. 5 | FIG. 6 |
|---|---|---|
| Diameter of openings in tube sheet (in) | 8 | 5.5 |
| Spacing between openings (in) | 5 | 3.5 |
| Diameter of end plates (in) = x | 13 | 9 |
| Tolerance between plates (in) = y | 0.5 | 0.25 |
| Tolerance of plates to inner wall of vessel (in) = z | 0.25 | 0.125 |
| Vessel wall thickness, including flange width (in) = w | 4 | 4 |
| Inner diameter of vessel (in) = 3x + 2y + 2z | 41 | 27.75 |
| Outer diameter of vessel (in) = 2w + 3x + 2y + 2z | 49 | 35.75 |

From Table 2, it can be seen that the vessel diameter is reduced by about 30% by using the FIG. 6 arrangement. This provides considerable savings in vessel size and weight but the vessel would have to be opened at both the feed and permeate ends to replace modules.

Example 4

Comparison of Vessel Diameters for Pressure Vessels Containing 19 Tubes

The steps used to arrive at a pressure vessel diameter for the seven-tube embodiment of the invention in Example 3 may be repeated to determine the diameter in a 19-tube embodiment. From FIG. 7, it can be seen that 5 tubes span the diameter of the pressure vessel. Table 3 shows the measurements and calculations for this embodiment.

TABLE 3

(19-tube vessel)

| Permeate-end configuration | FIG. 5 | FIG. 6 |
|---|---|---|
| Diameter of openings in tube sheet (in) | 8 | 5.5 |
| Spacing between openings (in) | 5 | 3.5 |
| Diameter of end plates (in) = x | 13 | 9 |
| Tolerance between plates (in) = y | 0.5 | 0.25 |
| Tolerance plates to inner wall of vessel (in) = z | 0.25 | 0.125 |
| Vessel wall thickness, including flange width (in) = w | 6 | 6 |
| Inner diameter of vessel (in) = 5x + 4y + 2z | 67.5 | 46.5 |
| Outer diameter of vessel (in) = 2w + 5x + 4y + 2z | 79.5 | 58.5 |

From Table 3, it can be seen that the vessel diameter is again reduced by about 30% by using the closer tube packing arrangement.

I claim:
1. A gas-separation assembly, comprising:
   (a) a plurality of module-carrying tubes each having a longitudinal tube wall and a tube interior containing a plurality of gas separation membrane elements aligned in series along the module-carrying tube;
   (b) a housing containing the module-carrying tubes, the housing comprising a residue end, a permeate end and a central portion between the ends;
   (c) a residue-end tube sheet mounted in the housing towards the residue end;
   (d) a permeate-end tube sheet mounted in the housing towards the permeate end;
   the tube sheets dividing the interior of the housing into three separate gas-tight spaces: (i) a residue gas space at the residue end, (ii) a permeate gas space at the permeate end, and (iii) a feed gas space in the central portion between the residue and permeate spaces, and in which the module-carrying tubes are mounted in spaced-apart relationship with each other;
   (e) a feed gas port in the central portion;
   (f) a permeate gas port at the permeate end;
   (g) a residue gas port at the residue end;
   (h) first means to pass feed gas from the feed gas space into the module-carrying tubes in such a way that parallel feed gas flow to multiple membrane elements within the module-carrying tube is provided;
   (i) second means to pass permeate gas to the permeate gas space;
   (j) third means for residue gas to be collected and passed to the residue gas space.

2. The assembly of claim 1, wherein the membrane elements are spiral-wound modules.

3. The assembly of claim 1, wherein the membranes elements are hollow-fiber modules.

4. The assembly of claim 1, wherein the membrane elements contain polymeric membranes having a rubbery selective layer.

5. The assembly of claim 1, wherein the membrane elements contain polymeric membranes having a glassy selective layer.

6. The assembly of claim 1, wherein the housing is made of steel.

7. The assembly of claim 1, wherein the housing is code-stamped and the tubes are not code-stamped.

8. The assembly of claim 1, wherein at least one of the residue end and the permeate end comprises a reversibly removable head.

9. The assembly of claim 1, wherein one of the tube sheets is welded to the housing.

10. The assembly of claim 1, wherein at least one of the tube sheets is reversibly attached to the housing.

11. The assembly of claim 1, wherein the first means comprises a set of apertures in each longitudinal tube wall positioned so that all membrane elements within the module-carrying tube are fed in parallel with feed gas.

12. The assembly of claim 11, wherein the set comprises at least two apertures.

13. The assembly of claim 11, wherein the second means comprises, for each module-carrying tube:
   (I) at least one permeate collection pipe in gas-transferring relationship with the gas-separation membrane elements;
   (II) a permeate extension pipe, connected to the permeate collection pipe, the connected pipes protruding longitudinally out of the module-carrying tube;
   (III) an opening in the permeate-end tube sheet of a diameter large enough to permit the permeate extension pipe to slide through the opening.

14. The assembly of claim 11, wherein the third means comprises a residue collection system mounted within the housing and comprising:
   (I) at least one residue collection manifold through which the module-carrying tubes pass and in gas-transferring relationship with the tube interiors;
   (II) a residue collection tube that passes through the manifold and that is in gas-transferring relationship with the tube interiors;
   (III) at least one opening in the residue end tube sheet that provides gas-transferring communication between the residue collection tube and the residue gas space.

15. The assembly of claim 14, wherein:
   (I) the residue collection manifold comprises a cylindrical volume having opposed faces and an annular wall between the faces, the faces having multiple oppositely aligned openings through which the module-carrying tubes and the residue collection tube may pass and against which the module-carrying tubes and the residue collection tube are sealed in gas-tight relationship;
   (II) the module-carrying tubes and the residue collection tube each have an opening contained within the cylindrical volume through which gas may pass from the module-carrying tubes to the residue collection tube.

16. The assembly of claim 14, wherein the residue collection manifold is slidingly engaged against the module-carrying tubes and the residue collection tube, such that all tubes may be pulled though the manifold.

17. The assembly of claim 14, comprising at least two residue collection manifolds.

18. The assembly of claim 14, wherein the residue tube sheet has a central opening to receive the residue collection tube and at least six peripheral openings to receive the module-carrying tubes.

19. The assembly of claim 1, wherein:
   (I) the number of membrane elements in at least one module-carrying tube is (n+m), where n and m are positive integers, n being greater than m;
   (II) the first means enables feed gas to pass in parallel to only a first group of n membrane elements, the n membrane elements thereby forming a first membrane separation step;
   and further comprising a fourth means for collecting a portion of intermediate residue gas from the first membrane separation step and directing such intermediate residue gas as feed gas in parallel to a second group of the remaining m membrane elements, the remaining m membrane elements thereby forming a second membrane separation step.

20. The assembly of claim 19, wherein the first means comprises a first set of apertures in each longitudinal tube wall positioned so that all membrane elements within the first group are fed in parallel with feed gas.

21. The assembly of claim 19, wherein the first group consists of two membrane elements and the first set consists of one aperture.

22. The assembly of claim 19, wherein the first group consists of three membrane elements and the first set consists of two apertures.

23. The assembly of claim 19, wherein the second means comprises, for each module-carrying tube:
   (I) at least one permeate collection pipe in gas-transferring relationship with the gas-separation membrane elements;

(II) a permeate extension pipe, connected to the permeate collection pipe, the connected pipes protruding longitudinally out of the module-carrying tube;

(III) an opening in the permeate-end tube sheet of a diameter large enough to permit the permeate extension pipe to slide through the opening.

24. The assembly of claim 19, wherein the fourth means comprises an intermediate gas collection and distribution system mounted within the housing and comprising:

(I) an intermediate gas collection manifold through which the module-carrying tubes pass and in gas-transferring relationship with the module-carrying tube interiors;

(II) an intermediate gas distribution manifold through which the module-carrying tubes pass and in gas-transferring relationship with the module-carrying tube interiors;

(III) an intermediate gas flow tube that passes through, and is in gas-transferring relationship with, the intermediate gas collection manifold and the intermediate gas distribution manifold, to enable gas to flow from the gas collection manifold to the gas distribution manifold.

25. The assembly of claim 19, wherein the third means comprises, for each module-carrying tube, an opening in the residue end tube sheet through which residue gas from the second membrane separation step may flow out of the module-carrying tube and into the residue gas space.

26. The assembly of claim 19, wherein the third means comprises a second-step residue collection manifold, through which the module-carrying tubes and the intermediate gas flow tube pass, and in gas transferring relationship with the module-carrying tube interiors and the residue gas space, to enable gas to flow out of the module-carrying tube and into the residue gas space.

27. The assembly of claim 24, wherein:

(I) all manifolds comprise a cylindrical volume having opposed faces and an annular wall between the faces, the faces having multiple oppositely aligned openings through which the module-carrying tubes and the intermediate gas flow tube may pass and against which the module-carrying tubes and the intermediate gas flow tube are sealed in gas-tight relationship;

(II) the module-carrying tubes and the intermediate gas flow tube each have an opening contained within the cylindrical volume through which gas may pass between the module-carrying tubes and the intermediate gas flow tube.

28. The assembly of claim 26, wherein:

(I) the second-step residue collection manifold comprises a cylindrical volume having opposed faces and an annular wall between the faces, the faces having multiple oppositely aligned openings through which the module-carrying tubes and the intermediate gas flow tube may pass and against which the module-carrying tubes and the intermediate gas flow tube are sealed in gas-tight relationship;

(II) the module-carrying tubes and the intermediate gas flow tube each have an opening contained within the cylindrical volume through which gas may pass between the module-carrying tubes and the intermediate gas flow tube.

29. The assembly of claim 24, wherein the all manifolds are slidingly engaged against the module-carrying tubes and the intermediate gas flow tube, such that all tubes may be pulled though the manifolds.

30. The assembly of claim 24, comprising at least one intermediate gas collection manifold and at least one intermediate gas distribution manifold.

31. The assembly of claim 24, wherein the residue tube sheet has a central opening to receive the intermediate gas flow tube and at least six peripheral openings to receive the module-carrying tubes.

32. A gas-separation assembly for low stage cut operation, comprising:

(a) a plurality of module-carrying tubes each having a longitudinal tube wall and a tube interior containing a plurality of gas separation membrane elements aligned in series along the module-carrying tube;

(b) a housing containing the module-carrying tubes, the housing comprising a residue end, a permeate end and a central portion between the ends;

(c) a residue-end tube sheet mounted in the housing towards the residue end;

(d) a permeate-end tube sheet mounted in the housing towards the permeate end;

the tube sheets dividing the interior of the housing into three separate gas-tight spaces: (i) a residue gas space at the residue end, (ii) a permeate gas space at the permeate end, and (iii) a feed gas space in the central portion between the residue and permeate spaces, and in which the module-carrying tubes are mounted in spaced-apart relationship with each other;

(e) a feed gas port in the central portion;

(f) a permeate gas port at the permeate end;

(g) a residue gas port at the residue end;

(h) a set of at least two apertures in each longitudinal tube wall positioned in such a way that parallel feed gas flow to multiple membrane elements within the module-carrying tube is provided;

(i) for each module-carrying tube:

(I) at least one permeate collection pipe in gas-transferring relationship with the gas-separation membrane elements;

(II) a permeate extension pipe, connected to the permeate collection pipe, the connected pipes protruding longitudinally out of the module-carrying tube;

(III) an opening in the permeate-end tube sheet through which the permeate extension pipe protrudes into the permeate end space and against which the permeate extension pipe is sealed in gas-tight relationship;

(j) a residue collection system mounted within the housing and comprising:

(I) at least one residue collection manifold through which the module-carrying tubes pass;

(II) a residue collection tube that passes through the manifold;

wherein the residue collection manifold comprises a cylindrical volume having opposed faces and an annular wall between the faces, the faces having multiple oppositely aligned openings through which the module-carrying tubes and the residue collection tube may pass and against which the module-carrying tubes and the residue collection tube are sealed in gas-tight relationship; and wherein the module-carrying tubes and the residue collection tube each have an opening contained within the cylindrical volume through which gas may pass from the module-carrying tubes to the residue collection tube; and (III) at least one opening in the residue end tube sheet that provides gas-transferring communication between the residue collection tube and the residue gas space.

33. A gas-separation assembly for high stage cut operation, comprising:

(a) a plurality of module-carrying tubes each having a longitudinal tube wall and a tube interior containing a plurality of (n+m) gas separation membrane elements aligned in series along the module-carrying tube, where n and in are positive integers, n being greater than m;
(b) a housing containing the module-carrying tubes, the housing comprising a residue end, a permeate end and a central portion between the ends;
(c) a residue-end tube sheet mounted in the housing towards the residue end;
(d) a permeate-end tube sheet mounted in the housing towards the permeate end;
the tube sheets dividing the interior of the housing into three separate gas-tight spaces: (i) a residue gas space at the residue end, (ii) a permeate gas space at the permeate end, and (iii) a feed gas space in the central portion between the residue and permeate spaces, and in which the module-carrying tubes are mounted in spaced-apart relationship with each other;
(e) a feed gas port in the central portion;
(f) a permeate gas port at the permeate end;
(g) a residue gas port at the residue end;
(h) a first set of apertures in each longitudinal tube wall positioned so that only a first group of n membrane elements are fed in parallel with feed gas, the n membrane elements thereby forming a first membrane separation step;
(i) for each module-carrying tube:
(I) at least one permeate collection pipe in gas-transferring relationship with the gas-separation membrane elements;
(II) a permeate extension pipe, connected to the permeate collection pipe, the connected pipes protruding longitudinally out of the module-carrying tube;
(III) an opening in the permeate-end tube sheet through which the permeate extension pipe protrudes into the permeate end space and against which the permeate extension pipe is sealed in gas-tight relationship;
(j) a collector for enabling residue gas from the second membrane separation step to flow into the residue gas space;
(k) an intermediate gas collection and distribution system mounted within the housing for collecting a portion of intermediate residue gas from the first membrane separation step and directing such intermediate residue gas as feed gas in parallel to a second group of the remaining m membrane elements, the remaining m membrane elements thereby forming a second membrane separation step, the intermediate gas collection and distribution system comprising:
(I) an intermediate gas collection manifold through which the module-carrying tubes pass and in gas-transferring relationship with the module-carrying tube interiors;
(II) an intermediate gas distribution manifold through which the module-carrying tubes pass and in gas-transferring relationship with the module-carrying tube interiors;
(III) an intermediate gas flow tube that passes through, and is in gas-transferring relationship with, the intermediate gas collection manifold and the intermediate gas distribution manifold, to enable gas to flow from the gas collection manifold to the gas distribution manifold.

34. A gas-separation process using the assembly of claim 1, and comprising:
(a) introducing a feed gas mixture into the feed gas port allowing the feed gas mixture to flow from the feed gas space into the module-carrying tubes and through the gas separation membrane elements, each element containing a membrane having a feed side and a permeate side;
(b) providing a driving force to induce permeation of a first portion of the feed gas mixture from the feed side to the permeate side;
(c) withdrawing from the permeate gas port a permeate gas stream comprising the first portion;
(d) withdrawing from the residue gas port a residue gas stream comprising a second portion of the feed gas mixture that has not permeated the membrane.

* * * * *